United States Patent
Chen et al.

(10) Patent No.: US 8,842,239 B2
(45) Date of Patent: Sep. 23, 2014

(54) LIGHT-GUIDE APPARATUS WITH MICRO-STRUCTURE, AND BACKLIGHT MODULE AND LCD DEVICE HAVING THE SAME

(75) Inventors: Jia-Jen Chen, Ping-Zhen (TW); Yu-Chun Tao, Ping-Zhen (TW); Yan Zuo Chen, Ping-Zhen (TW); Hao-Xiang Lin, Ping-Zhen (TW); Cheng-Yu Hsieh, Ping-Zhen (TW)

(73) Assignee: Entire Technology Co., Ltd. (TW)

( * ) Notice: Subject to any disclaimer, the term of this patent is extended or adjusted under 35 U.S.C. 154(b) by 320 days.

(21) Appl. No.: 13/135,991

(22) Filed: Jul. 20, 2011

(65) Prior Publication Data

US 2012/0026429 A1 Feb. 2, 2012

Related U.S. Application Data

(60) Provisional application No. 61/367,073, filed on Jul. 23, 2010, provisional application No. 61/367,055, filed on Jul. 23, 2010.

(51) Int. Cl.
*G02F 1/1335* (2006.01)
*F21V 7/04* (2006.01)

(52) U.S. Cl.
USPC ............. 349/65; 362/624; 362/626; 349/64

(58) Field of Classification Search
USPC ...................... 362/624, 626; 349/64, 65
See application file for complete search history.

(56) References Cited

U.S. PATENT DOCUMENTS

| | | | | |
|---|---|---|---|---|
| 6,275,338 B1* | 8/2001 | Arai et al. | | 359/599 |
| 6,667,782 B1* | 12/2003 | Taira et al. | | 349/65 |
| 7,077,556 B2* | 7/2006 | Sugiura | | 362/623 |
| 7,334,934 B2* | 2/2008 | Feng et al. | | 362/626 |
| 7,356,235 B2* | 4/2008 | Choi et al. | | 385/129 |
| 2006/0133113 A1* | 6/2006 | Koike et al. | | 362/626 |
| 2011/0037925 A1* | 2/2011 | Park et al. | | 349/64 |

* cited by examiner

*Primary Examiner* — Dennis Y Kim

(57) ABSTRACT

A light-guide apparatus for accompanying an edge light source to form a backlight module for an LCD display includes an upper light-distributing layer, a middle light-guiding layer and a lower reflective layer. The light-guiding layer further defines a light-introducing surface for allowing lights emitted from the edge light source to enter the light-guiding layer. The reflective layer reflects the lights back to the light-guiding layer. A light-exiting surface for allowing at least a portion of the lights to leave the light-guiding layer is defined on the top surface of the light-distributing layer and is perpendicular to the light-introducing surface. The light-distributing layer, the light-guiding layer and the reflective layer are manufactured integrally into a unique piece by a co-extrusion process so as to avoid possible existence of air spacing in between. Three-dimensional micro-structures are constructed on a reflective surface interfacing the reflective layer and the light-guiding layer.

9 Claims, 18 Drawing Sheets

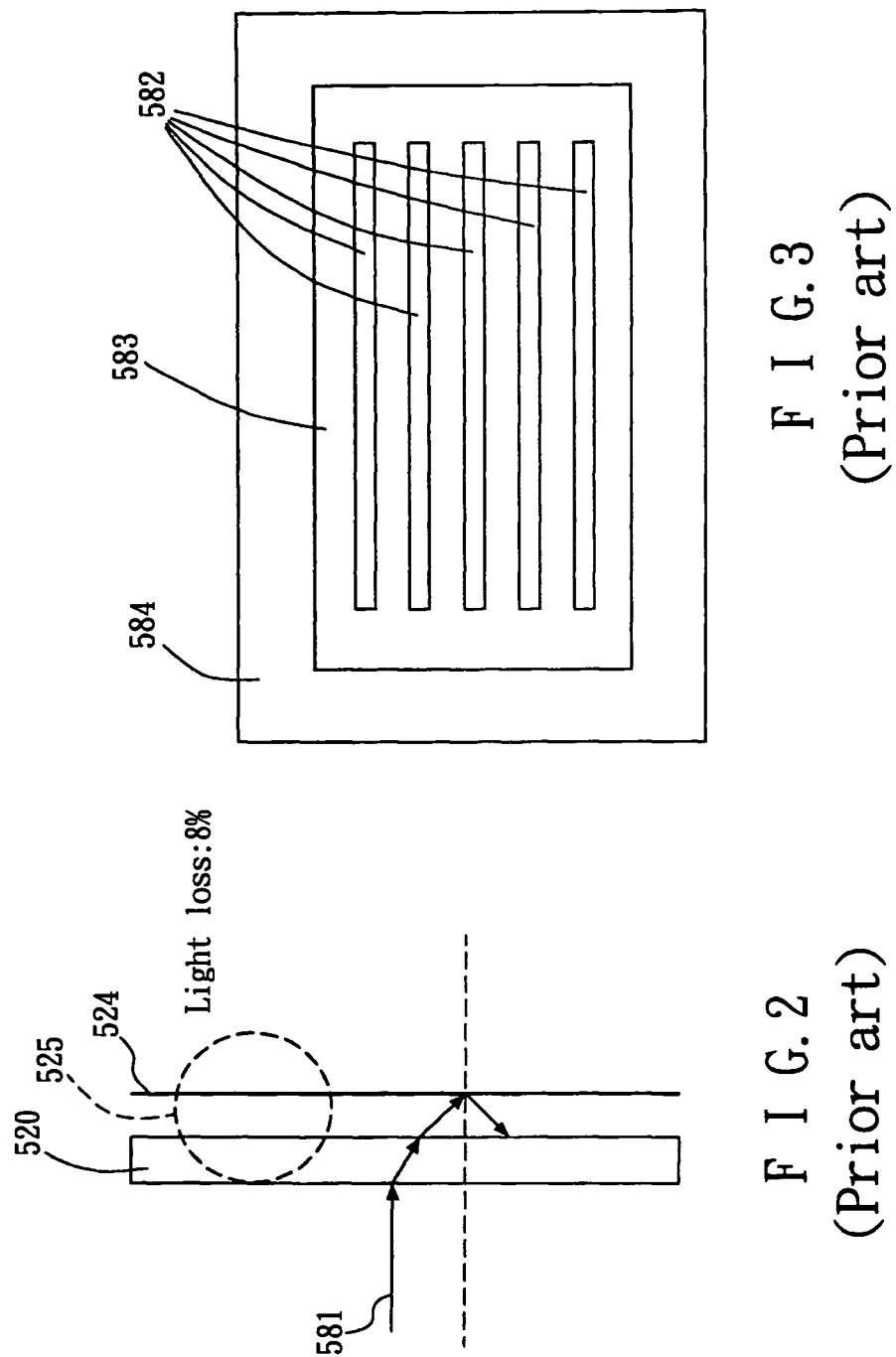

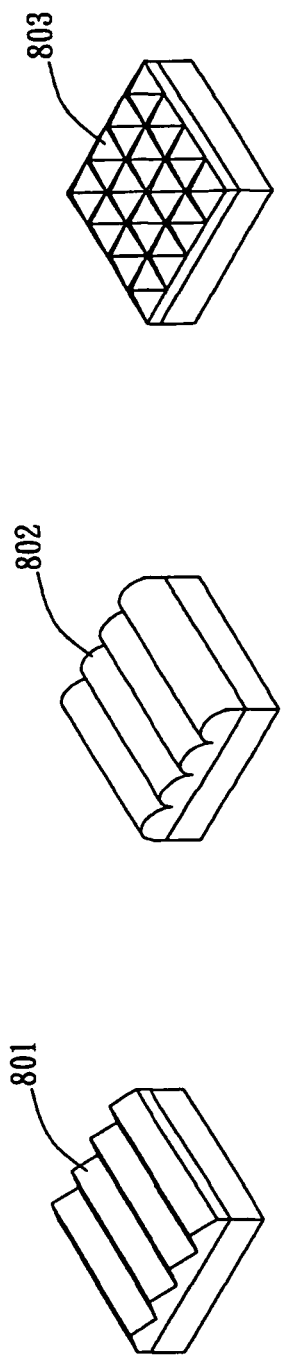

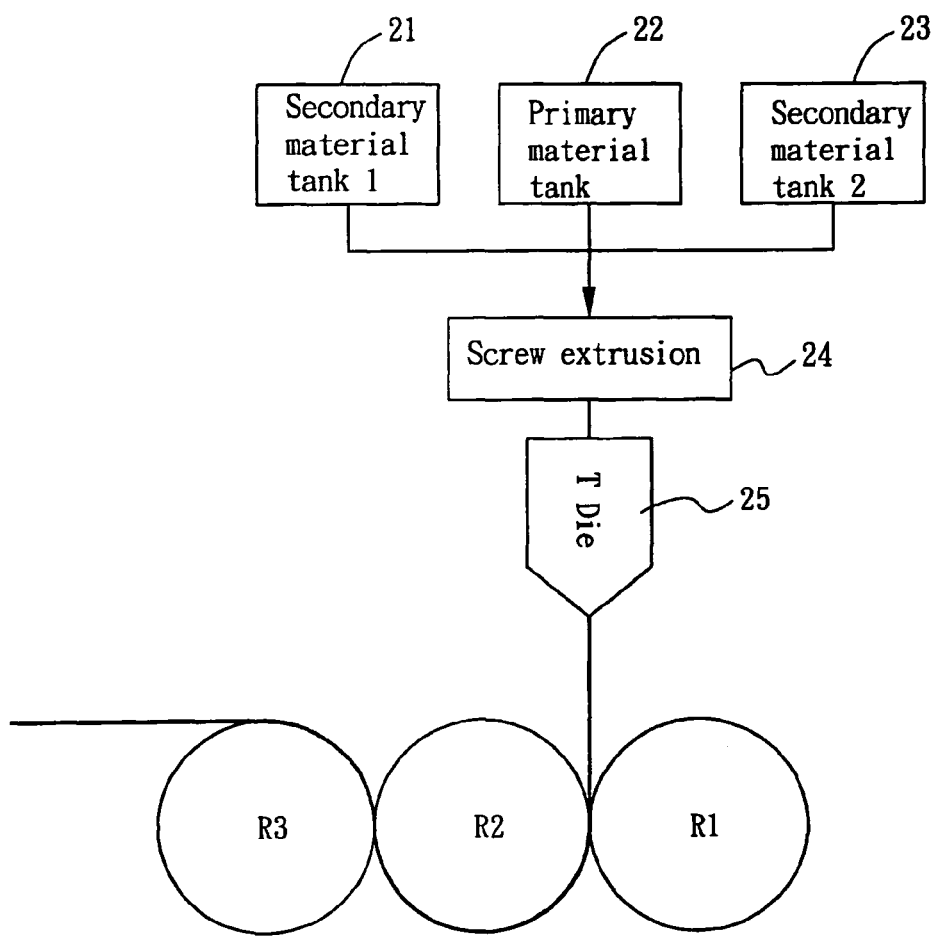
F I G. 11

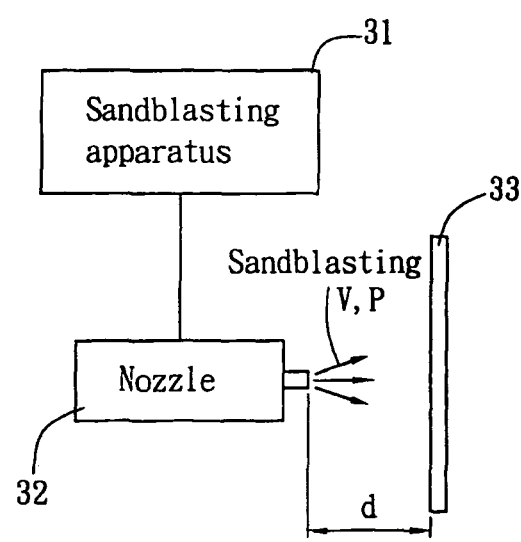
F I G. 12

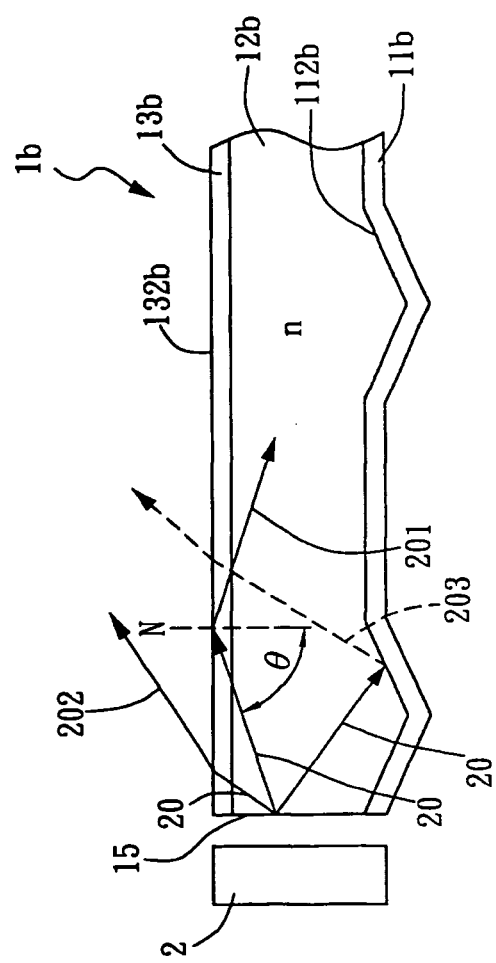
F I G. 13A

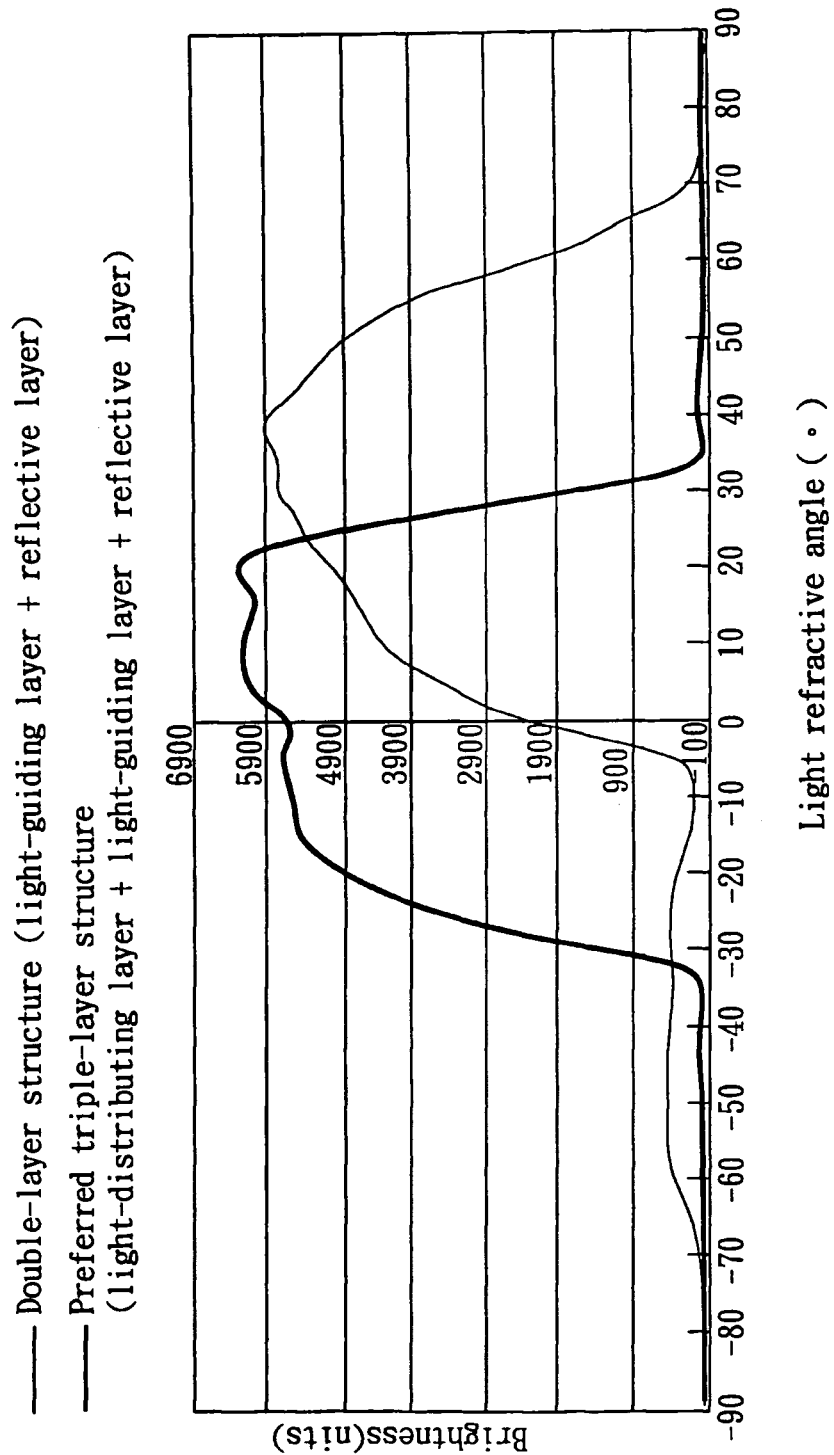
F I G. 13B

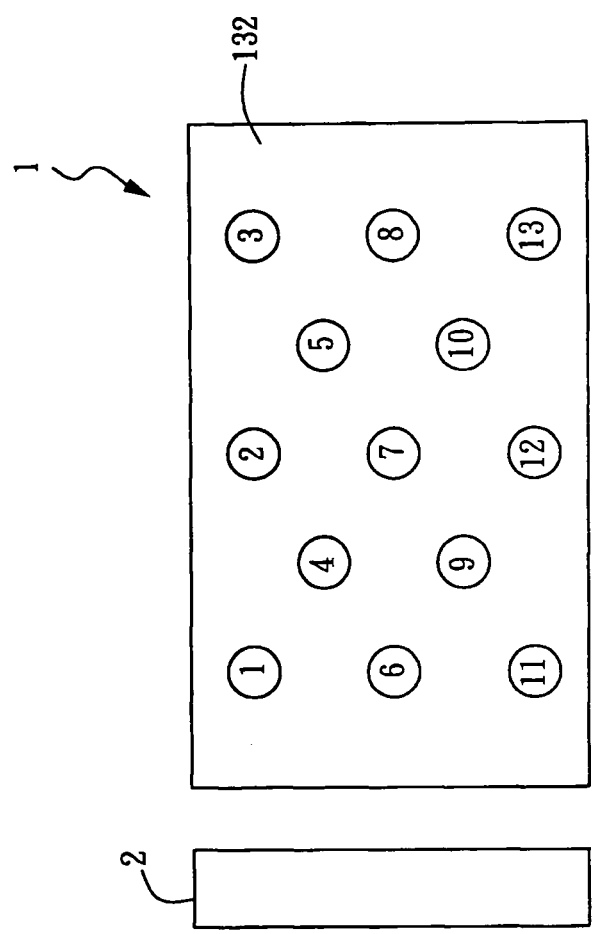

LIGHT-GUIDE APPARATUS WITH MICRO-STRUCTURE, AND BACKLIGHT MODULE AND LCD DEVICE HAVING THE SAME

BACKGROUND OF THE INVENTION (1) Field of the Invention

The invention relates to a light-guide apparatus with micro-structure, and more particularly to the light-guide apparatus which is manufactured by a co-extrusion process and capable of light reflection, distribution and guiding. The light-guide apparatus can integrate an edge light source to perform as a backlight module for display devices.

(2) Description of the Prior Art

A light-guide plate is known to be a light-guide medium for a backlight module of display devices. The light-guide plate can be used as an edge-type module that guides lights emitted by an edge light source to leave vertically from a front surface of the display device so as to enhance the luminance and distribution of the display device.

Theoretically, the light-guide plate is to direct the incident lights to a particular side (usually the front surface) of the plate. The lateral side of the plate can diffuse to reflect the lights back into the plate and to leave from the front surface of the plate. A high refractive index of the plate usually implies a better light-guiding performance. Also, the bottom surface of the light-guide plate is usually formed as a reflection surface to send back lights into the plate and so as to have the light leave the plate at the targeted front surface.

Referred to FIG. 1, a conventional backlight assembly 5 disclosed in a U.S. patent (U.S. Pat. No. 7,108,385, filed on Sep. 19, 2006) is shown to have an LCD panel 57, a diffusing film 56, a lens module 55, a light source module 50, and a light-guide module. The light-guide module further includes a front surface 523 for leaving the lights, a light-guide plate 520 and a reflection plate 524. The edge-type light source 50 energized and controlled by a circuit board 51 is attached to a lateral side 521 of the light-guide module.

In the art, the backlight assembly like the one shown in FIG. 1 usually has the following shortcomings in individual parts. These shortcomings in parts of the conventional backlight assembly are listed as follows in Table 1.

TABLE 1

Shortcomings in parts of a conventional backlight assembly

| Part | Function | Shortcomings |
| --- | --- | --- |
| Reflection plate 524 | To reflect incident lights back into the light-guide plate | Increasing the light loss and thus reducing the light utilization efficiency by the spacing in between with the light-guide plate<br>Increasing the cost of the backlight assembly |
| Light-guide plate 520 | To forward lights from the edge-type light source to the front surface | Ill-visibility caused by line defects from the necessary netting structure<br>Needing the diffusing film to cure the line defects |
| Diffusing film 56 | To homogenize the lights in the light-guide plate, and to protect the lens module from possible scratches | Increasing the cost of the backlight assembly |
| Lens module 55 (BEF) | To coverage the lights, and to enhance the luminosity | Increasing the cost of the backlight assembly by difficulties in manufacturing and design |
| | | Vulnerable to break and scratch<br>Causing redundant working cost in view of the working in the micro-structure of the light-guide plate |

Referred to FIG. 2, a lateral view of the light-guide plate 520 is shown to elucidate one of the aforesaid shortcomings in light loss of the light-guide plate 520 during a light transmission path. In order to increase the reflection efficiency of the backlight assembly 5, the additional reflection plate 524 is recommended to be included. Because a tiny air spacing 525 is always there between the reflection plate 524 and the light-guide plate 520, a loss in light 581 up to about 8% is inevitable. Such a light loss in between would decrease the light utilization efficiency but increase the manufacturing cost of the backlight assembly 5.

In addition, the light-guide plate in the art can be produced by applying an additional printing process, which involves steps of screen format preparing, inking and screen printing. All these complicated processes may contribute mainly to shortcomings in production yield and glazing bands. As shown in FIG. 3, glazing bands on a conventional light-guide plate 520 is schematically illustrated. These glazing bands may result in non-uniform brightness distribution to the light-guide plate 520; for example, to separate the screen into a bright area 582, a middle area 583 and a dark area 584.

As described above, the air spacing existing between the light-guide plate and the reflection plate can contribute to the increased light loss, the cost hike in producing the backlight assembly, the line defects, the manufacturing difficulty in the lens module and damages to the surface micro-structure. Hence, improvement upon overcoming the air spacing between plates shall be highly expected by the skill person in the art.

SUMMARY OF THE INVENTION

Accordingly, it is a primary object of the present invention to provide a light-guide apparatus with micro-structure, a backlight module and an LCD display having the same. By introducing the light-guide apparatus which is unique-piece formed as a triple-layer laminating plate by a co-extrusion process, the aforesaid shortcomings in light utilization efficiency, light uniformity, light luminance, production cost for backlight module and necessitating of the lens module can be improved.

To achieve the foregoing object, the light-guide apparatus with micro-structure in accordance with the present invention is introduced to accompany an edge light source to form a backlight module for an LCD display. The light-guide apparatus includes at least an upper light-distributing layer, a middle light-guiding layer and a lower reflective layer.

The light-guiding layer further defines a light-introducing surface for allowing lights emitted from the edge light source to enter therethrough the light-guiding layer. The reflective layer is to reflect the incident lights from the light-guiding layer back to the light-guiding layer. The light-distributing layer further defines a top free surface opposing to the reflective layer as a light-exiting surface. The light-exiting surface, spatially perpendicular to the light-introducing surface, is to allow at least a portion of the lights in the light-guiding layer to leave the light-guide apparatus therefrom.

In the present invention, the reflective layer, the light-guiding layer and the light-distributing layer are manufactured integrally into a unique piece by a co-extrusion process so as to avoid possible existence of air spacing between the reflective layer and the light-guiding layer. Further, a reflective surface is defined to an interface between the reflective layer and the light-guiding layer, and three-dimensional micro-structures are constructed onto the reflective surface.

In the preferred embodiment of the present invention, the value of depth-to-width ratio of the micro-structures on the reflective surface satisfies the following criterion.

$$45° < \cot^{-1}\left(\frac{H2}{0.5*P2}\right) < \sin^{-1}\left(\frac{n1}{n2}\right);$$

while n1<n2;

in which the H2 is the depth of the micro-structures of the reflective surface, the P2 is the width of the micro-structures of the reflective surface, the n1 is a refractive index of the light-distributing layer, and the n2 is a refractive index of the light-guiding layer.

In one embodiment of the present invention, the micro-structures of the light-guide apparatus further meets at least one of the following requirements:

(1) 0.2338≤(H2/P2)≤0.419;

(2) 80 μm≤P2≤250 μm, (3) 0.2≤(H2/P2)≤0.319, and 1≤(t1/t2)≤29, in which the t1 and the t2 are thicknesses of the light-distributing layer and the light-guiding layer, respectively; and (4) the micro-structures of the reflective surface being a non-continuous micro-structures commonly having an interval G in between thereof ranged from 0 to 1.4 mm.

In one embodiment of the present invention, the light-guide apparatus with micro-structure further includes at least one of the following:

(1) a plurality of diffusing particles, mixed in the light-guiding layer;

(2) a plurality of diffusing particles, mixed in the light-distributing layer;

(3) another three-dimensional micro-structures constructed on the light-exiting surface;

(4) two plastics with different refractive indexes, mixed in the reflective layer;

(5) a plurality of reflective particles, mixed in the reflective layer; and (6) one of a coarse surface and a matted surface with a controllable transmittance, formed on the light-exiting surface.

BRIEF DESCRIPTION OF THE DRAWINGS

The present invention will now be specified with reference to its preferred embodiment illustrated in the drawings, in which:

FIG. 2 is a lateral view of the light-guide plate and the diffusing plate of FIG. 1;

FIG. 3 shows possible line defects of FIG. 1;

FIG. 11 shows a block diagram for the co-extrusion process of FIG. 10;

FIG. 12 shows a block diagram for a sandblasting process to form a coarse surface of the light-guide apparatus with micro-structure in accordance with the present invention;

FIG. 13A shows schematically a further embodiment of the light-guide apparatus with micro-structure in accordance with the present invention;

FIG. 13B demonstrates relationship between the brightness and the light refractive angle for the light-exiting surface of the apparatus of FIG. 13A;

FIG. 14 shows a test arrangement for detecting the brightness of the light-exiting surface of the light-guide apparatus with micro-structure in accordance with the present invention.

DESCRIPTION OF THE PREFERRED EMBODIMENT

The invention disclosed herein is directed to a light-guide apparatus with micro-structure, a backlight module having the same light-guide apparatus, and an LCD display having the same light-guide apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

To better and clearly describe the light-guide apparatus with micro-structure according to the present invention and the backlight module as well as the LCD display applying this light-guide apparatus, following descriptions will be detailed by accompanying figures.

Figure 4:
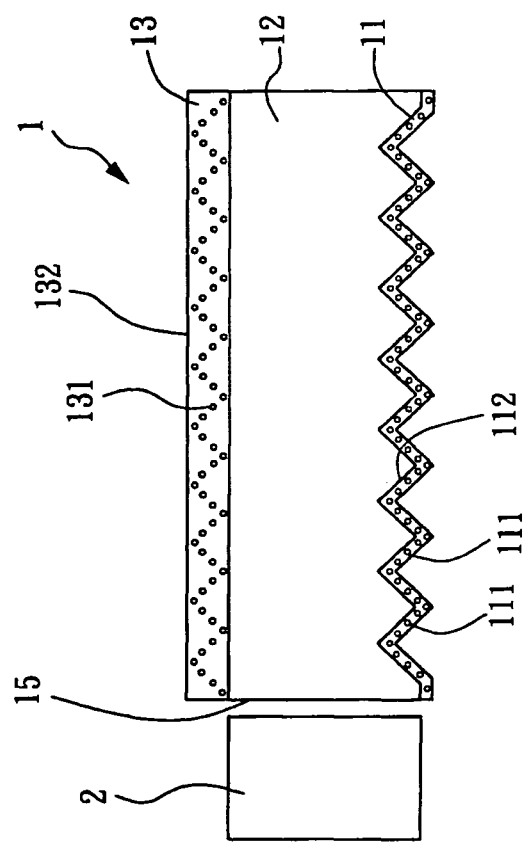
FIG. 4 shows schematically a preferred embodiment of the light-guide apparatus with micro-structure in accordance with the present invention.

(I) Briefing of the Present Invention on the Triple-Layer Laminating Plate of the Light-Guide Apparatus:

As shown in FIG. 4, the light-guide apparatus 1 with micro-structure, particularly an all-in-one light-guide apparatus, is to apply a co-extrusion process for producing the apparatus integrally as a unique piece to form three-dimensional micro-structures on a reflective surface interfacing the light-guiding layer and the reflective layer. Upon such an arrangement, the one-piece light-guide apparatus of the present invention can achieve functions in light-distributing, light-guiding and light-reflecting. Such an apparatus can be also applied to a large-scale panel by accompanying any kind of edge light source 2. The main body of the light-guide apparatus 1 mainly includes:

a micro-structured reflective layer 11;
a light-guiding layer 12; and
a micro-structured light-distributing layer 13.

As shown in FIG. 4, the main body of the light-guide apparatus 1 with micro-structure can be a simple one-piece triple-layer plate which can be produced by a co-extrusion process.

(II) Briefing of the Present Invention on the Reflective Layer 11 (the Lower Layer):

In the present invention, one of many important design concepts of the light-guide apparatus 1 with micro-structure is to apply an edge light source 2 to replace the conventional net-type light source. Also, the micro-structures are formed on a reflective surface between the reflective layer 11 and the light-guiding layer 11 to replace the conventional reflective plate. By applying the diffusing particles in the micro-structured light-distributing layer 13, the line or point light source can be homogenized and transformed into a surface light source. By the pairing of the micro-structures on the light-distributing layer 13 and the reflective layer 11, the conventional reflective plate can be replaced without sacrificing any function in light reflection, light-guiding or light distribution.

Figure 1:
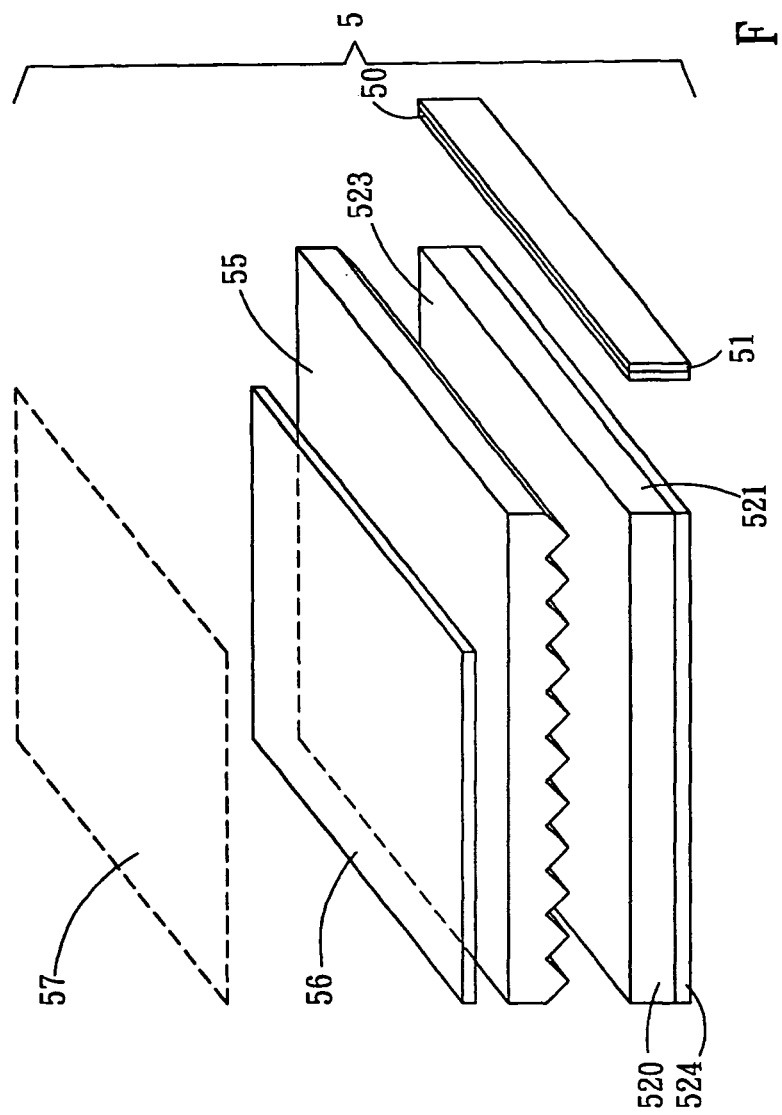
FIG. 1 is a schematic exploded view of a conventional backlight assembly.
Figure 5:
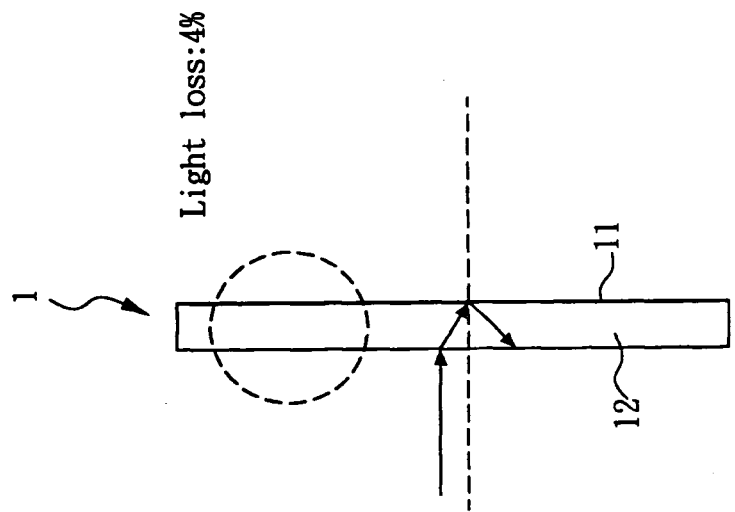
FIG. 5 shows how the apparatus of FIG. 4 can reduce the light loss.

By providing the aforesaid change in simultaneously forming the light-guiding layer 12 and the reflective layer 11, a substantial improvement in light loss can be gained by removing the conventional reflective plate. As shown in FIG. 5, the light-guide apparatus 1 with micro-structure adds micro-structures and the reflective layer 11 to the bottom surface of the light-guiding layer 12. Further, for simultaneously forming these three structures (the light-guiding layer 12, the micro-structures and the reflective layer 11), the existence of air spacing between the reflective layer 11 and the light-guiding layer 12 can be completely avoided, by compared to that shown in FIG. 2. Upon such an arrangement, the light utilization efficiency of the light-guide apparatus 1 of the present invention can be increased. Also, the micro-structures can contribute to the light-guiding layer 12 in light reflection and diffusion, such that the light loss of the light-guide apparatus of the present invention can be reduced to no more than 4%. Further, due to the manufacturing process for the light-guide apparatus 1 in accordance with the present invention is simplified, the film-adhering process, the process for producing the backlight module and the overall cost can be substantially reduced.

In the present invention, a preferred embodiment of the reflective layer 11 for the light-guide apparatus 1 with micro-structure can include the following features.

(1) The reflective layer 11 is produced by mixing two plastics with different refractive indexes, or by adding a predetermined amount of reflective particles into the matrix or plastics of the reflective layer 11.

(2) In the case that two plastics with different refractive indexes are used to form the base matrix of the reflective layer, the mixture rate can be a ratio of 7:3.

(3) In the case that the reflective particles 111 are introduced into the reflective layer 11, the refractive index for the reflective particle 111 can be ranged from 2.2~3.2, and the weight proportion of the reflective particles 111 can be less than 0.5%.

(4) The granular size of the reflective particles 111 can be ranged between 1-100 μm, preferable between 4-50 μm.

(5) The refractive index for the base matrix or plastics of the reflective layer 11 is ranged between 1.6-2.5.

(6) The difference in refractive index (Δn) between the reflective layer 11 and the light-guiding layer is ranged between 0.05-1.

(III) Briefing of the Present Invention on the Light-Distributing Layer 13 (the Upper Layer):

In the present invention, a preferred embodiment of the light guide apparatus 1 with micro-structure can add a plurality of micro diffusing particles 131 into the light-distributing layer 12 so as to transform the original line or point light source into a surface light source. Upon such an arrangement, the performance in the light distribution and homogeneity can be improved.

In the present invention, a preferred embodiment of the micro-structured light-distributing layer 13 for the light guide apparatus 1 can include the following features.

(1) The light-distributing layer 13 is added by a small amount of diffusing particles 131 or is matt finished at the light-exiting surface 131.

(2) The difference in refractive index (Δn) between the diffusing particles 131 and the light-distributing layer 13 is limited to 0.04<Δn<0.1.

(3) The granular size of the diffusing particles 131 is ranged between 2 μm~10 μm.

(4) The surface roughness (Ra) of the upper surface (the light-exiting surface 131) of the light-distributing layer 13 is defined as 1 μm<Ra<6 μm, so as to enhance the luminance and uniformity.

(5) The refractive index for the base matrix or plastics of the light-distributing layer is ranged between 1.42-1.63.

(IV) Briefing of the Present Invention on the Micro-Structure:

In the present invention, the reflective surface is defined to the interface between the light-guiding layer 12 and the reflective layer 11. Namely, the reflective surface is bottom to the light-guiding layer 12 but top to the reflective layer 11. A plurality of micro-structures of the present invention is formed on the reflective surface and/or the upper surface (the light-exiting surface 132) of the light-distributing layer 13. In the present invention, intervals for spacing these micro-structures can be the same interval, unequal intervals, or alternative-arranged intervals. Each of the micro-structures can be a three-dimensional miniaturized unit or protrusion (such as a pyramid-shape structure) that provides multiple symmetrical or unsymmetrical rising surfaces for omni-directional reflection. These three-dimensional miniaturized protrusions can be triangular structures, pillar structures, round-tip or arc structures and so on. In the preferred embodiment of the micro-structures in accordance with the present invention, following two criteria are satisfied.

(1) 0.02<H2/P2<0.8, wherein H2 and P2 are the depth and the width of the micro-structure on the reflective surface, respectively; preferably, 80 μm<P2<250 μm.

(2) 0.02<Rh(1/H2)<0.8 for boosting the reflection and light-guide performance of the apparatus 1, wherein the Rh is a thickness of the reflective layer.

(V) Briefing of the Present Invention on the Relationship Between the Light-Guiding Efficiency and the Thickness of the Reflective Layer 11 (the Lower Layer):

In the present invention, a preferred thickness range of the reflective layer 11 can be obtained by evaluating the relation between the thickness of the reflective layer 11 and the amount of incident rays. Preferably, the thickness of the reflective layer 11 shall be less than 1/10 of the total thickness of the plate body (including the light-distributing layer 13, the light-guiding layer 12 and the reflective layer 11).

Figure 6:
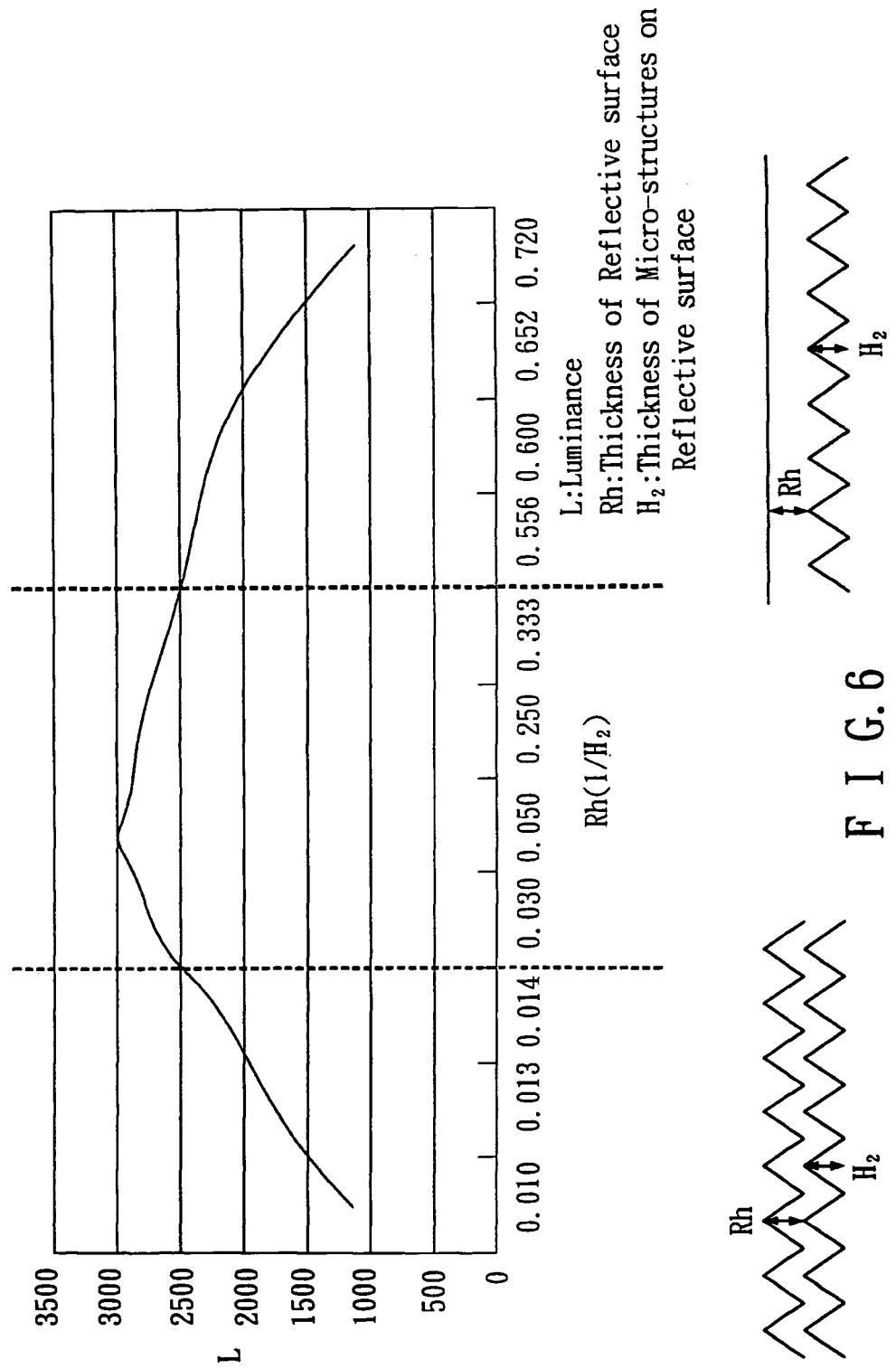
FIG. 6 illustrates a plot for elucidating the luminance change of the light-guide apparatus with micro-structure in accordance with the present invention.

(VI) Briefing of the Present Invention on the Relationship Between the Thickness of the Reflective Layer 11 (the Lower Layer) and the Depth of the Micro-Structures:

Referring to FIG. 6, a curve plot for elucidating the luminance change of the light-guide apparatus 1 with micro-structure in accordance with the present invention is present. In the plot, the Y-axis is the luminance value detected at the light-exiting surface, while the X-axis is the value of Rh(1/H2) as described above. As shown at the lower left corner of FIG. 6, in the case that both sides of the reflective layer are individually formed as continuous-extending triangular conical micro-structures, the Rh is measured at a vertical line penetrating a tip of the triangular conical micro-structure, belonged either to the upper or the lower micro-structure. Also, the depth of the micro-structure (H2) is measured at either the upper or the lower micro-structure for the height of a unit triangular conical micro-structure. As shown at the lower right corner of FIG. 6, in the case that only one side (the lower side) of the reflective layer is to form the continuous-extending triangular conical micro-structure, the Rh is measured as the vertical distance between a tip of the triangular conical micro-structure at the lower surface thereof and the upper flat surface. Similarly, the depth of the micro-structure (H2) is measured at the lower micro-structure for the height of a unit triangular conical micro-structure.

Hence, according to the data shown in FIG. 6, different values of Rh(1/H2) do vary the luminance of the apparatus of the invention. It is noted that, when $0.02 < Rh(1/H2) < 0.8$, satisfied performance in both the reflection and the light-guide can be achieved. Within this range, the reflection rate of the reflective layer is about 80%. Anything beyond this range implies a poor performance in either the reflection rate or the uniformity. Further, when $0.02 < Rh(1/H2) < 0.5$, optimal performance in both the reflection and the light-distribution of the apparatus (i.e. the luminance performance at the light-exiting surface) can be achieved.

(VII) Briefing of the Present Invention on the Relationship Among Thickness, Concentration and Uniformity of the Light-Distributing Layer 13 (the Upper Layer):

In the present invention, relationship among thickness, concentration and uniformity for a preferred embodiment of the light-distributing layer 13 and the light-guiding layer 12 may have the following features.

(1) The light-guiding layer 12 is added by a small amount of diffusing particles to resolve problems in line defects and ill-uniformity.

(2) The smaller the granular size of the diffusing particle is, the narrower the identical penetration distribution is.

(3) When the granular size of the diffusing particle becomes larger, the identical penetration distribution will become broader.

(4) The difference in refractive index, the granular size and the corresponding concentration of the diffusing particles in the light-distributing layer as well as the guiding layer 12 are all control parameters to the aforesaid relationship.

In the present invention, problems of the light-guide apparatus 1 in line defects and ill uniformity can be resolved by introducing or doping a small amount of diffusing particles into the light-guiding layer 12. Also, thereby, the light utilization rate of the apparatus 1 can be enhanced. When the difference of the refractive indexes between the diffusing particles and the plastic matrix of the light-guiding layer 12 is limited to $0.04 < \Delta n < 0.1$, a higher light penetration rate can be maintained. Further, the granular size of the diffusing particles in the light-guiding layer 12 is ranged between 2 µm~10 µm, and the refractive index for the matrix plastics of the light-guiding layer 12 is ranged between 1.42-1.63.

In addition, the thickness ratio of the light-distributing layer 13 to the light-guiding layer 12 and the concentration of the diffusing particles in the light-distributing layer 13 are highly related to the luminance and uniformity of the apparatus 1.

In the present invention, following factors of the apparatus 1 would affect the shape of the light-guiding layer 12 and the surface roughness of the light-distributing layer 13.

(1) The roughness of the surface (light-exiting surface 121) of the light-distributing layer 13 is in favor to the luminance of the light-guiding layer 12.

(2) The surface roughness of the upper surface (light-exiting surface 132) of the light-distributing layer 13 is varied with the micro-structures of the reflective surface of the reflective layer 11.

In summary, the surface roughness (Ra) on the surface (light-exiting surface 132) of the light-distributing layer 13 has the following merits: (1) to increase the luminance of the light-guiding layer; (2) to resolve the line defects; (3) to enhance the uniformity.

In the present invention, a better luminance (L) can be obtained while the surface roughness (Ra) on the surface (light-exiting surface 132) of the light-distributing layer 13 is limited to the range of 1 µm to 6 µm.

(VIII) Briefing of the Present Invention on Various Embodiment Aspects of the Light-Guide Apparatus with Micro-Structure:

In the light-guide apparatus 1 with micro-structure of the present invention, the diffusing particles 131 are optional to the light-distributing layer 13, and the upper surface (the light-exiting surface 132) of the light-distributing layer 13 can be a mirror surface, a matted surface, a design with continuous micro-structures, a design of non-continuous micro-structures with single-side edge lighting, a design of non-continuous microstructures with dual-side edge lighting, or any other appropriate design.

Similarly, the diffusing particles 122 can also be optional to the light-guiding layer 12, and the interfacing surface (the reflective surface 112) between the reflective layer 11 and the light-guiding layer 12 can be a mirror surface, a matted surface, a design with continuous micro-structures, a design of non-continuous micro-structures with single-side edge lighting, a design of non-continuous microstructures with dual-side edge lighting, or any other appropriate design.

Figure 7:
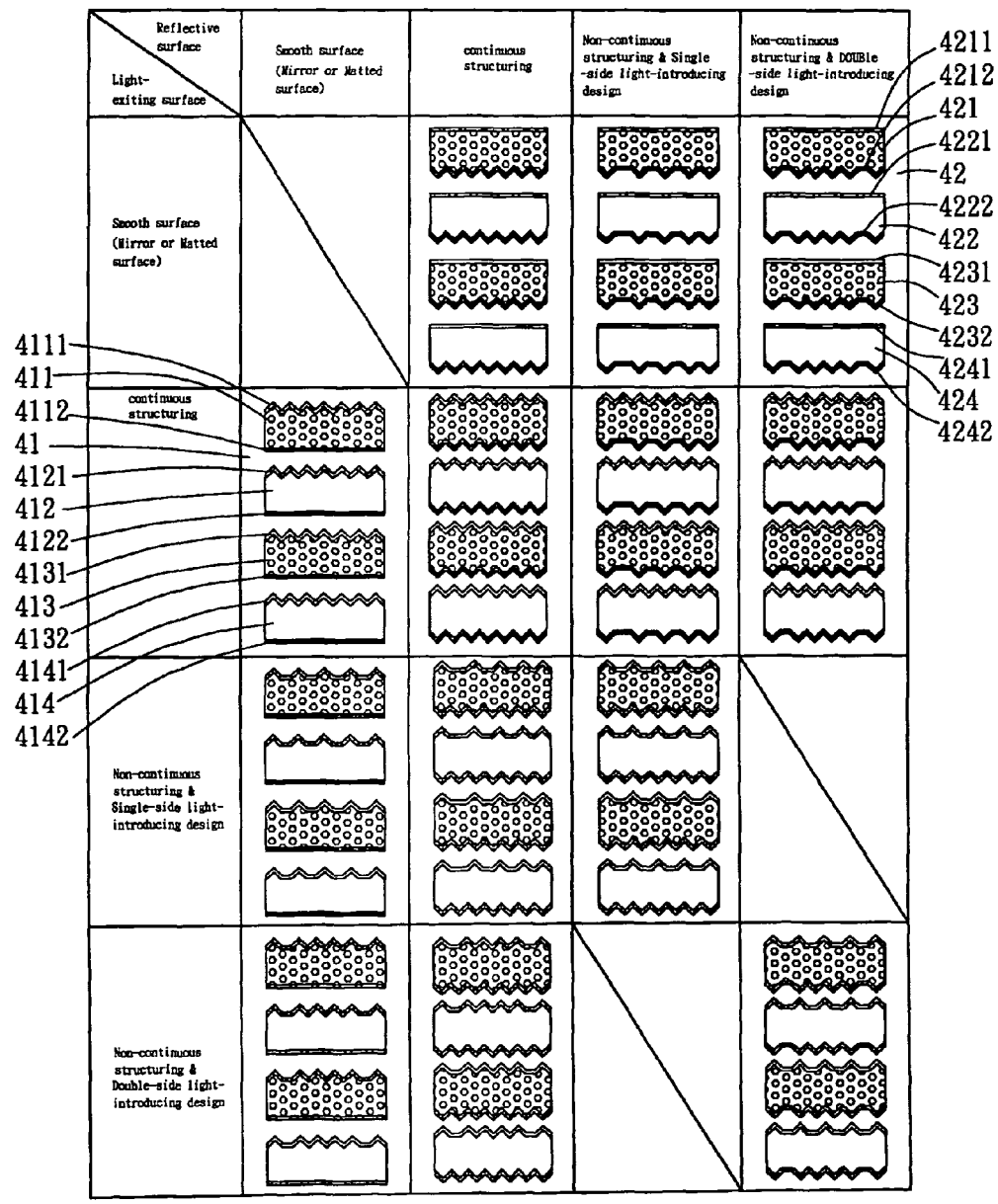
FIG. 7 illustrates various aspects applicable to the light-distributing layer, the light-guiding layer and the reflective layer of the light-guide apparatus with micro-structure in accordance with the present invention.

Hence, to pair the reflective layer 11, the light-guiding layer 12 and the light-distributing layer 13 by mixing the aforesaid designs, all possible pairs applicable to the apparatus 1 of the present invention can be shown in FIG. 7.

For example, in position 41 of FIG. 7, four structures 411, 412, 413, 414 are shown orderly from top to bottom. Among these four structures 411-414, the top surfaces (light-exiting surfaces 4111, 4121, 4131, 4141) of all four structures 411-414 are all continuously structured, yet the light-distributing layers of the two structures 411, 412 include the diffusing particles while the light-distributing layers of the other two structures 413, 414 do not include the diffusing particles. Also, the reflective surfaces 4112, 4122, 4132, 4142 interfacing the corresponding light-guiding layers and the reflective layers are all embodied as flat surfaces (mirror or matted surfaces). It is also noted that the structures 411, 413 do have diffusing particles in the corresponding light-guiding layers, while the other two structures 412, 414 don't have diffusing particles in the corresponding light-guiding layers.

Further, for another example, in position 42 of FIG. 7, four structures 421, 422, 423, 424 are shown orderly from top to bottom. Among these four structures 421-424, the top surfaces (light-exiting surfaces 4211, 4221, 4231, 4241) of all four structures 421-424 are all flat surfaces (mirror or matted surfaces), yet the light-distributing layers of the two structures 421, 422 include the diffusing particles while the light-distributing layers of the other two structures 423, 424 do not include the diffusing particles. Also, the reflective surfaces 4212, 4222, 4232, 4242 interfacing the corresponding light-guiding layers and the reflective layers are all non-continuously constructed with dual-side edge lighting. It is also noted that the structures 421, 423 do have diffusing particles in the corresponding light-guiding layers, while the other two structures 422, 424 don't have diffusing particles in the corresponding light-guiding layers.

In the present invention, both the light-exiting surface and the reflective surface can have micro-structures, no matter if they are continuous, non-continuous, single-side lighting, or dual-side lighting. In such embodiments, the directional arrangement of the micro-structures on the light-exiting surface with respect to that on the reflective surface can be parallel or orthogonal.

In the present invention, besides the pairing of the light-exiting surface and the reflective surface of the light-guide apparatus 1 with micro-structure can be versatile as described above, the structuring or the configuration of the micro-structures constructed on the light-exiting surface and/or the reflective surface can be also various. Embodiments to illustrate such a declamation are shown in, but not limited to, FIG. 8A through FIG. 8O, which will be elucidated orderly in the following paragraphs.

Referring now to FIG. 8A, a first embodiment of the micro-structures applicable to be constructed on the light-exiting surface and/or the reflective surface of the light-guide apparatus 1 in accordance with the present invention is schematically perspective shown. In this embodiment, the micro-structures can include a plurality of triangular strips 801 continuously arranged in a parallel and extending manner.

Referring now to FIG. 8B, a second embodiment of the micro-structures applicable to be constructed on the light-exiting surface and/or the reflective surface of the light-guide apparatus 1 in accordance with the present invention is schematically perspective shown. In this embodiment, the micro-structures can include a plurality of semi-cylindrical strips 802 continuously arranged in a parallel and extending manner.

Referring now to FIG. 8C, a third embodiment of the micro-structures applicable to be constructed on the light-exiting surface and/or the reflective surface of the light-guide apparatus 1 in accordance with the present invention is schematically perspective shown. In this embodiment, the micro-structures can include a plurality of conical protrusions 803 (in a pyramid shape) continuously arranged in an array manner.

Referring now to FIG. 8D, a fourth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of spherical protrusions 804 continuously arranged in an array manner.

Referring now to FIG. 8E, a fifth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of round-tip protrusions 805 continuously arranged in an array manner.

Figure 8F:
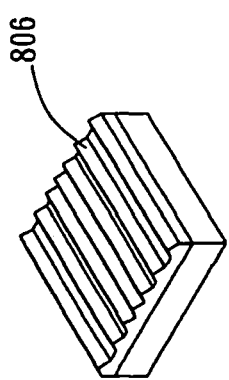
FIG. 8A through FIG. 8O show various embodiments of the micro-structures of the light-guide apparatus in accordance with the present invention.

Referring now to FIG. 8F, a sixth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of triangular strips 806 non-continuously arranged in a parallel and extending manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Figure 8G:
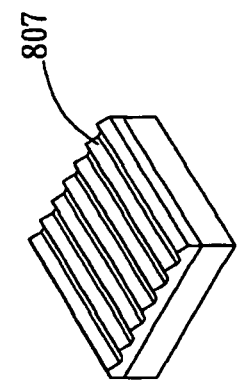

Referring now to FIG. 8G, a seventh embodiment of the micro-structures applicable to be constructed on the light-exiting surface and/or the reflective surface of the light-guide apparatus 1 in accordance with the present invention is schematically perspective shown. In this embodiment, the micro-structures can include a plurality of triangular strips 807 non-continuously arranged in a parallel and extending manner according to an equal-spacing pattern.

Figure 8H:
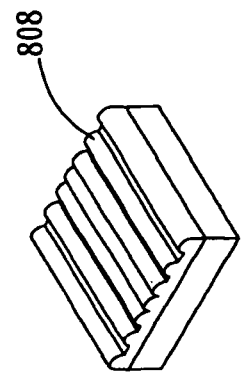

Referring now to FIG. 8H, an eighth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of semi-cylindrical 808 non-continuously arranged in a parallel and extending manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Figure 8I:
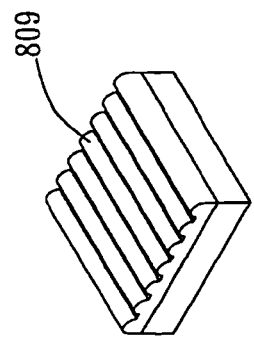

Referring now to FIG. 8I, a ninth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of semi-cylindrical strips 809 non-continuously arranged in a parallel and extending manner according to an equal-spacing pattern.

Figure 8J:
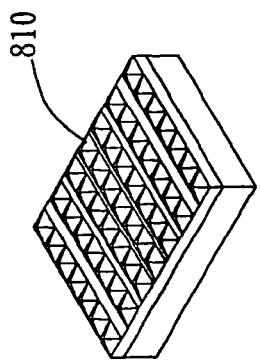

Referring now to FIG. 8J, a tenth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of conical protrusions 810 (in a pyramid shape) non-continuously arranged in an array manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Figure 8K:
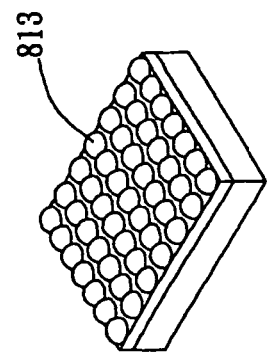

Referring now to FIG. 8K, an eleventh embodiment of the micro-structures applicable to be constructed on the light-exiting surface and/or the reflective surface of the light-guide apparatus 1 in accordance with the present invention is schematically perspective shown. In this embodiment, the micro-structures can include a plurality of conical protrusions 811 (in a pyramid shape) non-continuously arranged in an array manner according to an equal-spacing pattern.

Figure 8L:
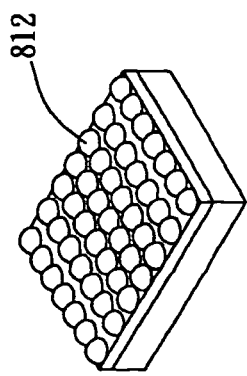

Referring now to FIG. 8L, a twelfth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of spherical protrusions 812 non-continuously arranged in an array manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Figure 8M:
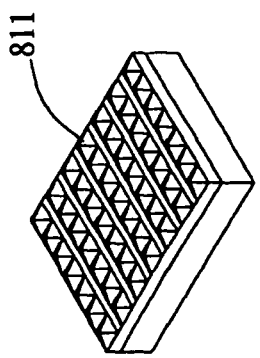

Referring now to FIG. 8M, a thirteenth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of spherical protrusions 813 non-continuously arranged in an array manner according to an equal-spacing pattern.

Figure 8N:
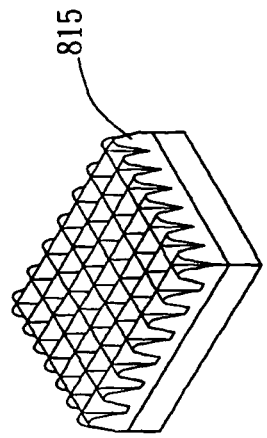

Referring now to FIG. 8N, a fourteenth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of round-tip protrusions 814 non-continuously arranged in an array manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Figure 8O:
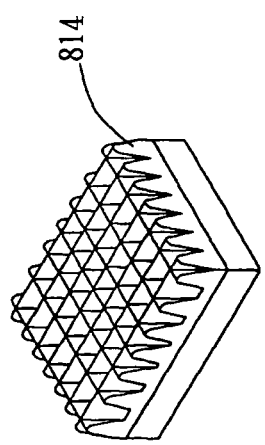

Referring now to FIG. 8O, a fifteenth embodiment of the micro-structures applicable to be constructed on the light-exiting surface and/or the reflective surface of the light-guide apparatus 1 in accordance with the present invention is schematically perspective shown. In this embodiment, the micro-structures can include a plurality of round-tip protrusions 815 non-continuously arranged in an array manner according to an equal-spacing pattern.

Figure 9:
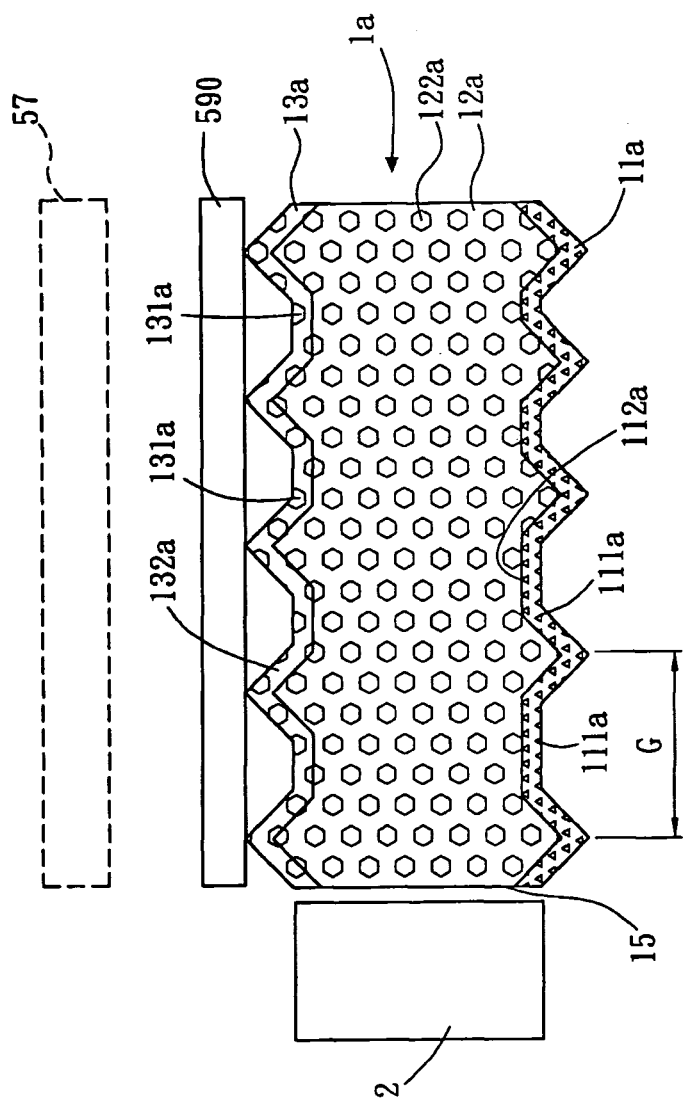
FIG. 9 shows schematically another embodiment of the light-guide apparatus with micro-structure in accordance with the present invention.

Referring now to FIG. 9, another embodiment of the light-guide apparatus 1a with micro-structure in accordance with the present invention is schematically shown. In this embodiment, micro-structures are constructed respectively to the light-exiting surface 132a (the upper surface) of the light-distributing layer 13a and the reflective surface 112a interfacing the reflective layer 11a and the light-guiding layer 12a. In particular, the micro-structures on the reflective surface 112a and those on the light-exiting surface 132a are arranged non-continuously. The micro-structures for the reflective surface 112a are shown to be constructed according to a density-varying pattern. As shown, it is found that larger intervals G are located at the end of the micro-structures closing to the light-introducing surface 15, and smaller intervals G are assigned to the adjacent micro-structures located away from the light-introducing surface 15. Upon such an arrangement in density of the micro-structures, the exiting lights can be much more uniform, and the shortcoming in bright spots close to the light-introducing surface 15 can thus be overcome. In addition, when the interval G of the non-continuous micro-structures on the reflective surface 112a is ranged between 0~1.4 mm and when at least an appropriate optical film 590 is applied to adhere on the light-exiting surface 132a, possible line defects on the light-exiting surface 132a can be completely avoided. Similarly, in the case that a similar non-continuous density-varying pattern is applied to the micro-structures on the light-exiting surface 132a, the comparable light uniformity can also be achieved.

In the light-guide apparatus 1a with micro-structure in accordance with the present invention, by introducing at least one optical film 590 onto the light-exiting surface 132a, having an edge light source 15 close to the light-introducing surface 15, and accompanying other appropriate accessories known in the art, a compact set of backlight module can be provided. Further, by integrating the backlight module to a conventional LCD panel 57, an LCD display having the light-guide apparatus 1a can be thus formed.

Figure 10:
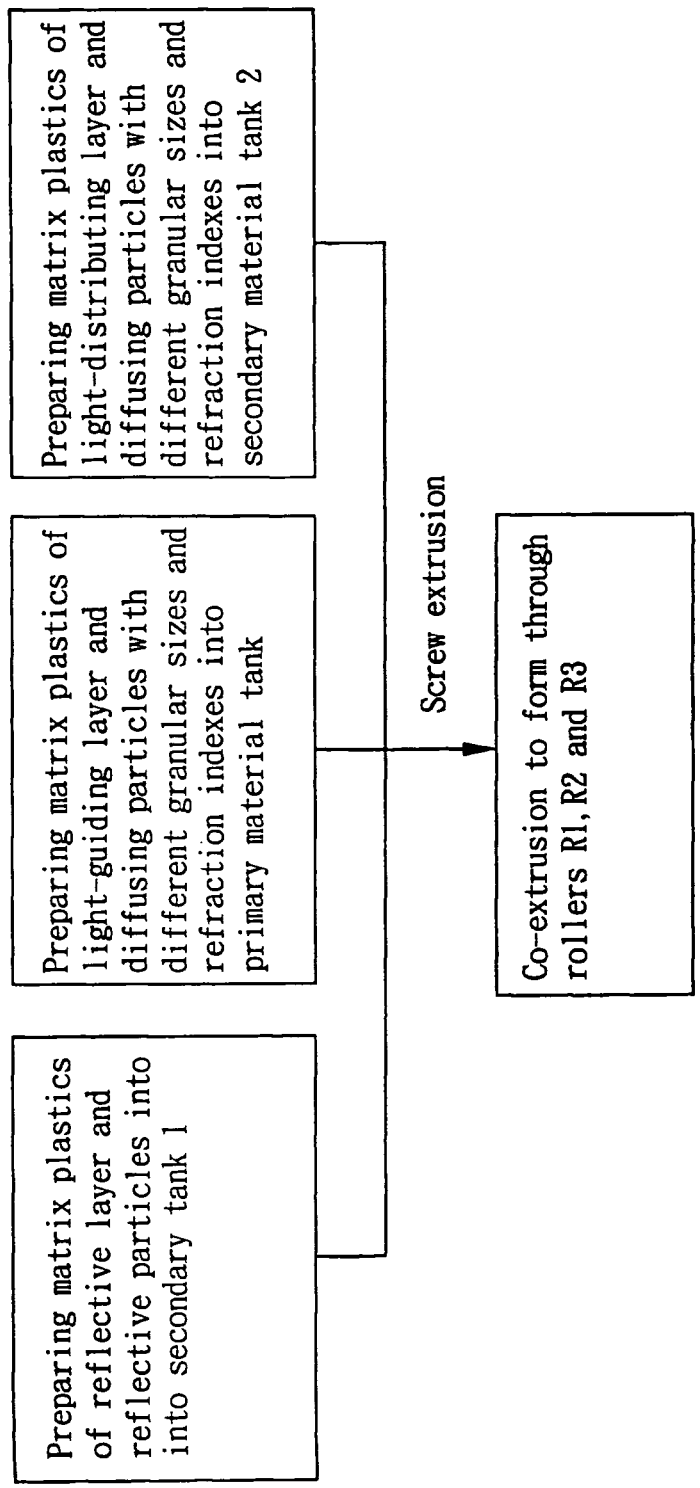
FIG. 10 is a flowchart of a co-extrusion process to manufacture the light-guide apparatus with micro-structure in accordance with the present invention.

Referring now to FIG. 10 and FIG. 11, an embodiment of a co-extrusion process for manufacturing the uniform reflective light-guide apparatus with micro-structure in accordance with the present invention is shown in a flowchart and a schematic block diagram, respectively. The triple-layer laminating structure shown in FIG. 9 is typically used to explain how this co-extrusion process can produce the light-guide apparatus 1a as a unique piece. First of all, prepare the matrix plastics for forming the reflective layer 11a and an appropriate amount of reflective particles 111a in a material tank 21 of a secondary extrusion machine 1. Also, prepare the matrix plastics for forming the light-guiding layer 12a and a proper amount of diffusing particles 122a with various granular sizes and various refractive indexes in a material tank 22 of a primary extrusion machine. Further, prepare the matrix plastics for forming the light-distributing layer 13a and an appropriate amount of diffusing particles 131a with various granular sizes and various refractive indexes in a material tank 23 of another secondary extrusion machine 2. In the present invention, the matrix plastics and the diffusing particles 122a, 131a can be either the same or different materials. Then, materials in the material tanks 21, 22 and 23 are further being screw extrusion mixed (24), respectively, before being sent to be extruded into respective layers of the T die 25. The materials mixed with corresponding particles or beads are simultaneously extruded out of the T Die 25 as a laminating form and are further rolled to form consequently by the rollers R1, R2 and R3. The micro-structures on the upper surface (the light-exiting surface) or the lower surface (the reflective surface) is pressed to set by the micro-structure pattern prepared on the roller surface of R1, R2 and/or R3. Then, the "all-in-one" main plate body of the light-guide apparatus 1a is formed. By compared to the conventional coating process which coats a reflective layer onto the light-guiding layer, the "all-in-one" co-extrusion process provided by the present invention can be more easily as an advanced manufacturing process.

Referring now to FIG. 12, a block diagram for a process to form a coarse surface on the light-exiting surface in accordance with the present invention is shown. In the present invention, the surface roughness for the coarse surface or matted surface of the light-exiting surface (i.e. the upper surface of the light-distributing layer) can be controlled by adjusting the sandblasting apparatus 31 by regulating the sandblasting pressure p, sandblasting velocity v, and the distant d between the sandblasting nozzle 32 and the roller surface 33. The roller surface 33 with a predetermined surface roughness can then be used as the micro-structure pattern for rollers R1, R2 and/or R3. The surface roughness of the coarse surface will affect the electrostatic adhesion between the light-exiting surface of the light-guide apparatus of the present invention and the optical films, and the light uniformity of the light-guide apparatus. Table 2 lists a typical example.

TABLE 2

Adhesion relation between surface roughness of coarse surfaces (light-exiting surfaces) and optical films

| | Example A | Example B | Example C | Example D | Example E |
|---|---|---|---|---|---|
| d (mm) | 220 | 220 | 220 | 220 | 220 |
| p (MPa) | 0.38 | 0.38 | 0.38 | 0.38 | 0.38 |
| v (m/min) | 15 | 12 | 8 | 4 | 1 |
| Surface roughness Ra (μm) | 0.07 | 0.46 | 1.35 | 2.21 | 2.52 |
| Adhesion of optical films | Easy | Fair | Difficult | Difficult | Difficult |

In Table 2, when the surface roughness (Ra) of the light-exiting surface of the apparatus of the present invention is less than 0.46 μm, the adhesion between the light-exiting surface and the optical member will become easier and thus scratches in between become highly possible. When Ra is greater than 2.21 μm, the light output at the light-exiting surface will increase but only to decrease the light uniformity of the apparatus. Further, when Ra is greater than 6 μm, the lighting quality of the apparatus might be hard to pass the manufacturer's QC. Therefore, in the present invention, the surface roughness of the coarse surface formed on the light-exiting surface of the light-guide apparatus in accordance with the present invention is limited to a range between 0.46 μm and 2.21 μm, preferably the range between 1 μm and 2.21 μm.

In the present invention, the plastics, the matrix plastics, or say the base matrix for the light-guiding layer and the reflective layer can be selected from, but not limited to, appropriate plastics available in the market, such as polymethylmethacrylate (PMMA), polycarbonate (PC), polyethylene terephthalate (PET), MS and so on. The diffusing particles for the light-guiding layer can be also selected from, but not limited to, appropriate plastics particles available in the market, such as PMMA particles, PC particles, PET particles, MS particles and so on. Similarly, the reflective particles can be selected from, but not limited to, appropriate materials available in the market, such as SiO2 particles, TiO2 particles and so on.

Regards the co-extrusion process for producing the light-guide apparatus of the present invention, various advantages can be obtained, such as the unique-piece plate body, high light utilization efficiency, low light loss, no need of additional reflective plate and brightness-enhancing films (BEF), simple structuring, less expanding on the backlight module, less adhesion to the optical members, and plenty optical merits in light uniformity, luminance and user comfort.

Referring now to FIG. 13A and FIG. 13B, a further embodiment of the light-guide apparatus 1b with micro-structure in accordance with the present invention and relationship plot between the brightness and the light refractive angle for the light-exiting surface of the apparatus of FIG. 13A are schematically shown, respectively. In the plot, the X axis shows the light refractive angle of the light ray at the light-exiting surface, ranged from 0 degree to 90 degrees, while the Y axis shows the brightness corresponding to the light refractive angle. By having the apparatus 1b shown in FIG. 13A as an example, it is understood that the apparatus 1b, mainly a unique-piece triple-layer laminating plate structure produced by a co-extrusion process, includes an upper light-distributing layer 13b, a middle light-guiding layer 12b and a lower reflective layer 11b having the reflective particles. A light-introducing surface 15 is defined laterally to the light-guiding layer 12b of the apparatus 1b. Aside to the light-introducing surface 15, an edge light source 2 (a CCFL or an LED) is located to emit a light 20. The light 20 is introduced into the light-guiding layer 12b of the apparatus 1b, through the light-introducing surface 15. Also, a reflective surface 112b is defined to the interface between the light-guiding layer 12b and the reflective layer 11b. Namely, the reflective surface 112b is the bottom surface of the light-guiding layer 12b and is also the top surface of the reflective layer 11b. The free top surface of the light-distributing layer 13b, which is the surface away from the reflective layer 11b, is defined as a light-exiting surface 132b. The diffusing particles are optional to both the light-guiding layer 12b and the light-distributing layer 13b. In the case that the same material (including the matrix plastics and the optional diffusing particles) is applied to the light-guiding layer 12b and the light-distributing layer 13b, the apparatus 1b can also be read as a unique-piece co-extruded double-layer laminating structure having only the light-guiding layer and the reflective layer. In FIG. 13A, materials for the light-guiding layer 12b and the light-guiding layer 13b are the same.

In the embodiment shown in FIG. 13A, the light-introducing surface 15 is perpendicular to the light-exiting surface 121b. At an arbitrary point on the light-exiting surface 121b, a normal line perpendicular to the local light-exiting surface 121b is defined. According to the setup of the reflective layer 11b, the light 20 deflected downward in the light-guiding layer 12b would be reflected (203) back, at a different angle, to the light-guiding layer 12b, by the micro-structured reflective surface 112b. In the present invention, when the light 20 in the light-guiding layer 12b hits the light-exiting surface 132b, reflection 201 and penetration 202 can both be included, according to the incident direction of the light 20 and the angle θ defined with the normal line N. Actually, the refractive index n of the material for the light-distributing layer 13b and the critical refractive angle θc are two parameters to determine whether the light 20 would be reflected back or penetrate at the light-exiting surface 132b. In the art, $\theta c = \sin^{-1}(1/n)$.

In this embodiment, the refractive index n=1.58 for the light-distributing layer 13b (so as the light-guiding layer 12b), and thus θc=39.26 (about 40 degrees). In another embodiment, if the refractive index n=1.49 for the light-distributing layer 13b (so as the light-guiding layer 12b), and thus θc=42.16 (about 42 degrees). In the case that the incident angle θ of the light 20 hitting the light-exiting surface 132b is less than the corresponding critical refractive angle θc, the light 20 would penetrate (202) through the light-exiting surface 132b. On the other hand, when the incident angle θ of the light 20 hitting the light-exiting surface 132b is larger than the corresponding critical refractive angle θc, the light 20 would be reflected back (201) to the light-distributing layer 13b (also the light-guiding layer 12b) by the light-exiting surface 132b.

According to FIG. 13A and referring now to FIG. 13B, two curves are found in the plot; one for a double-layer structure of the apparatus 1b having the same material for the light-guiding layer 12b and the light-distributing layer 13b, and another one for a triple-layer structure of the apparatus 1b having different materials for the light-guiding layer 12b and the light-distributing layer 13b. As shown in FIG. 13B, the curve for the double-layer structure without a particular light-distributing design is obviously shifted to the right side of the figure where the refractive angle is mostly positive. Namely, in this case that the apparatus 1b is lack of a prominent light-distributing layer for providing various refractions, the brightest spot would be fallen into a limited range from 30 degrees to 50 degrees. It is to say that the optimal angle at 0 degree for people eyes is greatly missed in this embodiment. On the other hand, the triple-layer structure having microstructures on the reflective surface with appropriate depth-to-width ratio and relevant arrangement for refractive indexes and thicknesses to the light-distributing layer and the light-guiding layer can perform better and present a curve in FIG. 13B with brightest spot at the range from −20 degrees to +20 degrees.

According to the light efficiency evaluation method described above in elucidating FIG. 13A and FIG. 13B, various pairs to combine different reflective surfaces having micro-structures with different depth-to-width ratios, and different arrangements for the light-distributing layer and the light-guiding layer in refractive indexes and thicknesses have been evaluated and the related data are sorted in the following Table 3.

In this evaluation, measuring on the brightness of the light-exiting surface is referred to FIG. 14, where a test arrangement for detecting the brightness of the light-exiting surface of the light-guide apparatus with micro-structure in accordance with the present invention is schematically shown. In FIG. 14, 13 testing spots are selected on the light-exiting surface 132. By providing an edge light source 2 to the light-guide apparatus 1, brightness values can be measured at these 13 testing spots. By equalizing all these brightness values, a mean value for each testing can be obtained and can then be fed into the corresponding position in Table 3.

TABLE 3

Brightness statistics for the light-guide apparatus with a reflective surface, a light-guiding layer and a light-distributing layer

| No. | Depth/width ratio | n1 | n2 | t1(mm) | t2(mm) | t1/t2 | Brightness (nits) |
|---|---|---|---|---|---|---|---|
| 1 | 0.5 | 1.58 | N.A. | 3 | 0 | N.A. | 2867 |
| 2 | 0.5 | 1.49 | N.A. | 3 | 0 | N.A. | 2932 |
| 3 | 0.5 | 1.58 | 1.46 | 2 | 1 | 2 | 1917 |
| 4 | 0.5 | 1.49 | 1.58 | 2 | 1 | 2 | 991.6 |
| 5 | 0.5 | 1.58 | 1.49 | 1.5 | 1.5 | 1 | 2271 |
| 6 | 0.5 | 1.49 | 1.58 | 1.5 | 1.5 | 1 | 1688 |
| 7 | 0.5 | 1.58 | 1.49 | 1 | 2 | 0.5 | 2600 |
| 8 | 0.5 | 1.49 | 1.58 | 1 | 2 | 0.5 | 2340 |
| 9 | 0.5 | 1.58 | 1.49 | 0.5 | 2.5 | 0.2 | 2909 |
| 10 | 0.5 | 1.49 | 1.58 | 0.5 | 2.5 | 0.2 | 2917 |
| 11 | 0.419 | 1.58 | N.A. | 3 | 0 | N.A. | 4598 |
| 12 | 0.419 | 1.49 | N.A. | 3 | 0 | N.A. | 4593 |
| 13 | 0.419 | 1.58 | 1.49 | 2 | 1 | 2 | 3249 |
| 14 | 0.419 | 1.49 | 1.58 | 2 | 1 | 2 | 3265 |
| 15 | 0.419 | 1.58 | 1.49 | 1.5 | 1.5 | 1 | 3699 |
| 16 | 0.419 | 1.49 | 1.58 | 1.5 | 1.5 | 1 | 3776 |
| 17 | 0.419 | 1.58 | 1.49 | 1 | 2 | 0.5 | 4123 |
| 18 | 0.419 | 1.49 | 1.58 | 1 | 2 | 0.5 | 4239 |
| 19 | 0.419 | 1.58 | 1.49 | 0.5 | 2.5 | 0.2 | 4551 |
| 20 | 0.419 | 1.49 | 1.58 | 0.5 | 2.5 | 0.2 | 4625 |
| 21 | 0.419 | 1.58 | 1.49 | 0.3 | 2.7 | 0.11 | 4519 |
| 22 | 0.419 | 1.49 | 1.58 | 0.3 | 2.7 | 0.11 | 4632 |
| 23 | 0.319 | 1.58 | N.A. | 3 | 0 | N.A. | 4996 |
| 24 | 0.319 | 1.49 | N.A. | 3 | 0 | N.A. | 5318 |
| 25 | 0.319 | 1.58 | 1.49 | 2.9 | 0.1 | 29 | 2891 |
| 26 | 0.319 | 1.49 | 1.58 | 2.9 | 0.1 | 29 | 5609 |
| 27 | 0.319 | 1.58 | 1.49 | 2.5 | 0.5 | 5 | 2919 |
| 28 | 0.319 | 1.49 | 1.58 | 2.5 | 0.5 | 5 | 5634 |
| 29 | 0.319 | 1.58 | 1.49 | 2 | 1 | 2 | 3456 |
| 30 | 0.319 | 1.49 | 1.58 | 2 | 1 | 2 | 5459 |
| 31 | 0.319 | 1.58 | 1.49 | 1.5 | 1.5 | 1 | 4039 |
| 32 | 0.319 | 1.49 | 1.58 | 1.5 | 1.5 | 1 | 5321 |
| 33 | 0.319 | 1.58 | 1.49 | 1 | 2 | 0.5 | 4628 |
| 34 | 0.319 | 1.49 | 1.58 | 1 | 2 | 0.5 | 5130 |
| 35 | 0.288 | 1.58 | N.A. | 3 | 0 | N.A. | 4081 |
| 36 | 0.288 | 1.49 | N.A. | 3 | 0 | N.A. | 4495 |
| 37 | 0.288 | 1.58 | 1.49 | 2.9 | 0.1 | 29 | 2516 |
| 38 | 0.288 | 1.49 | 1.58 | 2.9 | 0.1 | 29 | 5735 |
| 39 | 0.288 | 1.58 | 1.49 | 2.7 | 0.3 | 9 | 2520 |
| 40 | 0.288 | 1.49 | 1.58 | 2.7 | 0.3 | 9 | 5750 |
| 41 | 0.288 | 1.58 | 1.49 | 2.6 | 0.4 | 6.5 | 2520 |
| 42 | 0.288 | 1.49 | 1.58 | 2.6 | 0.4 | 6.5 | 5755 |
| 43 | 0.288 | 1.58 | 1.49 | 2.5 | 0.5 | 5 | 2549 |
| 44 | 0.288 | 1.49 | 1.58 | 2.5 | 0.5 | 5 | 5751 |
| 45 | 0.288 | 1.58 | 1.49 | 2.3 | 0.7 | 3.29 | 2701 |
| 46 | 0.288 | 1.49 | 1.58 | 2.3 | 0.7 | 3.29 | 5592 |
| 47 | 0.288 | 1.58 | 1.49 | 2 | 1 | 2 | 2975 |
| 48 | 0.288 | 1.49 | 1.58 | 2 | 1 | 2 | 5326 |
| 49 | 0.288 | 1.58 | 1.49 | 1.5 | 1.5 | 1 | 3342 |
| 50 | 0.288 | 1.49 | 1.58 | 1.5 | 1.5 | 1 | 4900 |
| 51 | 0.288 | 1.58 | 1.49 | 1 | 2 | 0.5 | 3922 |
| 52 | 0.288 | 1.49 | 1.58 | 1 | 2 | 0.5 | 4470 |
| 53 | 0.233 | 1.58 | N.A. | 3 | 0 | N.A. | 2267 |
| 54 | 0.233 | 1.49 | N.A. | 3 | 0 | N.A. | 2576 |
| 55 | 0.233 | 1.58 | 1.49 | 2.9 | 0.1 | 29 | 1352 |
| 56 | 0.233 | 1.49 | 1.58 | 2.9 | 0.1 | 29 | 4301 |
| 57 | 0.233 | 1.58 | 1.49 | 2.5 | 0.5 | 5 | 1383 |
| 58 | 0.233 | 1.49 | 1.58 | 2.5 | 0.5 | 5 | 4283 |
| 59 | 0.233 | 1.58 | 1.49 | 2 | 1 | 2 | 1648 |
| 60 | 0.233 | 1.49 | 1.58 | 2 | 1 | 2 | 3813 |
| 61 | 0.233 | 1.58 | 1.49 | 1.5 | 1.5 | 1 | 1941 |
| 62 | 0.233 | 1.49 | 1.58 | 1.5 | 1.5 | 1 | 3818 |
| 63 | 0.233 | 1.58 | 1.49 | 1 | 2 | 0.5 | 2239 |
| 64 | 0.233 | 1.49 | 1.58 | 1 | 2 | 0.5 | 2783 |
| 65 | 0.2 | 1.58 | N.A. | 3 | 0 | N.A. | 2266 |
| 66 | 0.2 | 1.49 | N.A. | 3 | 0 | N.A. | 2182 |
| 67 | 0.2 | 1.58 | 1.49 | 2.9 | 0.1 | 29 | 815.2 |
| 68 | 0.2 | 1.49 | 1.58 | 2.9 | 0.1 | 29 | 2576 |
| 69 | 0.2 | 1.58 | 1.49 | 2.5 | 0.5 | 5 | 853.5 |
| 70 | 0.2 | 1.49 | 1.58 | 2.5 | 0.5 | 5 | 2534 |
| 71 | 0.2 | 1.58 | 1.49 | 2 | 1 | 2 | 1209 |
| 72 | 0.2 | 1.49 | 1.58 | 2 | 1 | 2 | 2553 |
| 73 | 0.2 | 1.58 | 1.49 | 1.5 | 1.5 | 1 | 1560 |
| 74 | 0.2 | 1.49 | 1.58 | 1.5 | 1.5 | 1 | 2511 |
| 75 | 0.2 | 1.58 | 1.49 | 1 | 2 | 0.5 | 1874 |
| 76 | 0.2 | 1.49 | 1.58 | 1 | 2 | 0.5 | 2436 |
| 77 | 0.2 | 1.58 | 1.49 | 0.5 | 2.5 | 0.2 | 2135 |
| 78 | 0.2 | 1.49 | 1.58 | 0.5 | 2.5 | 0.2 | 2361 |
| 79 | 0.181 | 1.58 | N.A. | 3 | 0 | N.A. | 2512 |
| 80 | 0.181 | 1.49 | N.A. | 3 | 0 | N.A. | 2399 |
| 81 | 0.181 | 1.58 | 1.49 | 2 | 1 | 2 | 1254 |
| 82 | 0.181 | 1.49 | 1.58 | 2 | 1 | 2 | 2313 |
| 83 | 0.181 | 1.58 | 1.49 | 1.5 | 1.5 | 1 | 1655 |
| 84 | 0.181 | 1.49 | 1.58 | 1.5 | 1.5 | 1 | 2433 |
| 85 | 0.181 | 1.58 | 1.49 | 1 | 2 | 0.5 | 2038 |
| 86 | 0.181 | 1.49 | 1.58 | 1 | 2 | 0.5 | 2513 |
| 87 | 0.181 | 1.58 | 1.49 | 0.7 | 2.3 | 0.3 | 2245 |
| 88 | 0.181 | 1.49 | 1.58 | 0.7 | 2.3 | 0.3 | 2559 |
| 89 | 0.181 | 1.58 | 1.49 | 0.5 | 2.5 | 0.2 | 2352 |
| 90 | 0.181 | 1.49 | 1.58 | 0.5 | 2.5 | 0.2 | 2606 |
| 91 | 0.181 | 1.58 | 1.49 | 0.3 | 2.7 | 0.11 | 2365 |
| 92 | 0.181 | 1.49 | 1.58 | 0.3 | 2.7 | 0.11 | 2541 |
| 93 | 0.134 | 1.58 | N.A. | 3 | 0 | N.A. | 1739 |
| 94 | 0.134 | 1.49 | N.A. | 3 | 0 | N.A. | 1601 |
| 95 | 0.134 | 1.58 | 1.49 | 2 | 1 | 2 | 1106 |
| 96 | 0.134 | 1.49 | 1.58 | 2 | 1 | 2 | 1468 |
| 97 | 0.134 | 1.58 | 1.49 | 1.5 | 1.5 | 1 | 1259 |
| 98 | 0.134 | 1.49 | 1.58 | 1.5 | 1.5 | 1 | 1562 |
| 99 | 0.134 | 1.58 | 1.49 | 1 | 2 | 0.5 | 1417 |
| 100 | 0.134 | 1.49 | 1.58 | 1 | 2 | 0.5 | 1644 |

In Table 3, column "Depth/width ratio" indicates the ratio of the depth (H2) to the width (P2) for the micro-structures on the reflective surface of the light-guide apparatus, column "n1" indicates the value for the refractive index of the light-distributing layer, column "n2" indicates the value for the refractive index of the light-guiding layer, column "t1" indicates the value for the thickness of the light-distributing layer, column "t2" indicates the value for the thickness of the light-guiding layer, and column "Brightness" indicates the mean value for the 13 testing data.

In Table 3, from the testing results No. 11 to No. 64, it is easy to see that when the H2/P2 is ranged between 0.233 and 0.419, preferable brightness can be obtained. Also, the brightness for n1<n2 is better than that for n2>n1. Further, from testing results No. 23 to No. 78, when the H2/P2 is ranged between 0.2 and 0.319 and 1≤t1/t2≤29, the brightness of the triple-layer structured apparatus is large over that of the double-layer structured apparatus by 67%, in particular by comparing No. 54 and No. 56. It is noted that the result of FIG. 13B is translated into data in No. 42, which presents a 5755-nits brightness on the light-exiting surface.

Figure 15A:
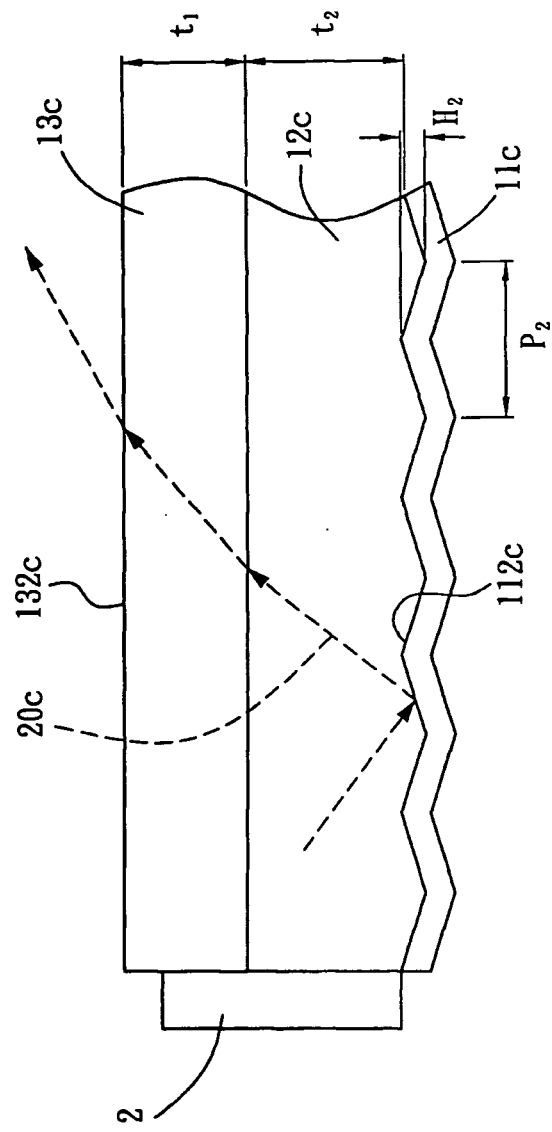
FIG. 15A, FIG. 15B and FIG. 15C illustrate various light patterns within the same light-guide apparatus with micro-structure in accordance with the present invention.
Figure 15B:
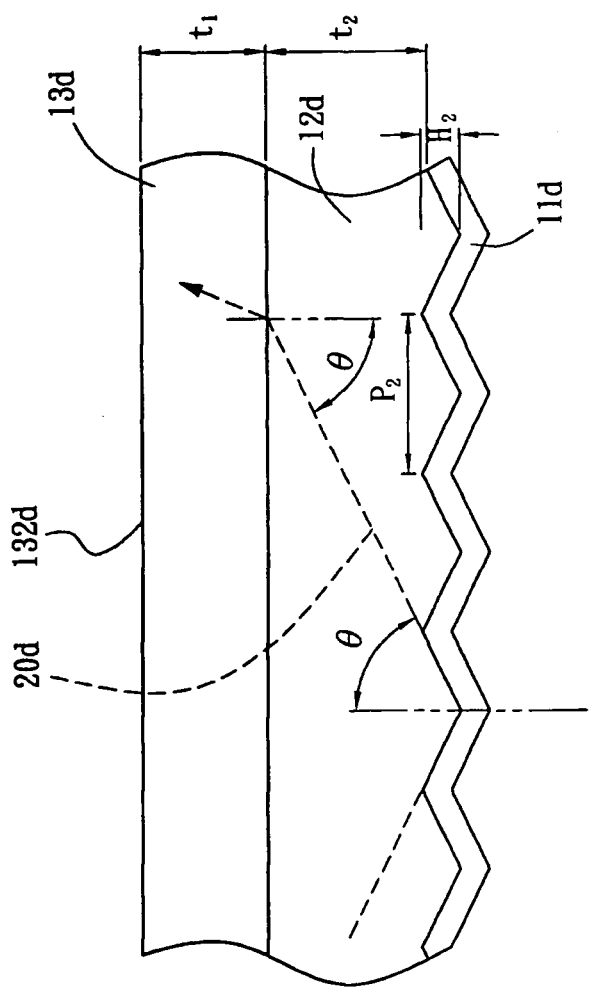
Figure 15C:
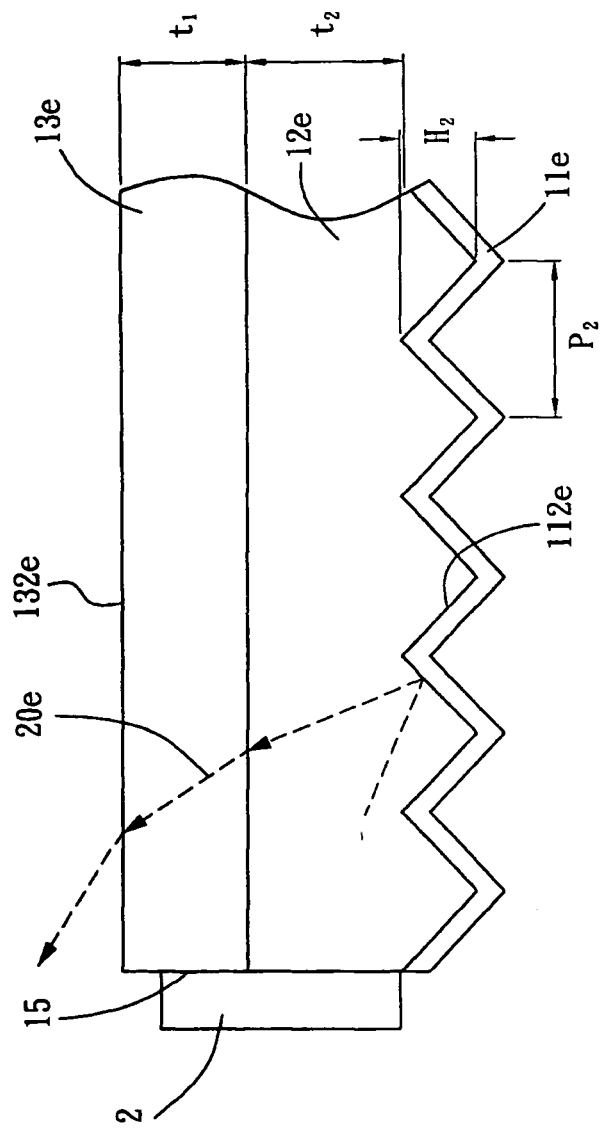

Referring now to FIG. 15A, FIG. 15B and FIG. 15C, various light patterns within the same light-guide apparatus with micro-structure in accordance with the present invention are illustrated individually.

In FIG. 15A, in the case that the H2/P2 for the reflective surface 112c is too small, the light 20c reflected by the micro-structures on the reflective surface 112c of the reflective layer 11c would present to be deflected toward a larger viewing angle and to leave away the front vision angle, such that the detected brightness at the light-exiting surface 132c would be low. Therefore, in order to obtain a better bright performance, the H2/P2 can't be less than 0.134; i.e., satisfying $$\cot^{-1}\left(\frac{H2}{0.5*P2}\right) < 75°$$

As shown in FIG. 15B, in the case of n1<n2, for example when n1=1.49 and n2=1.58, following result can be concluded.

$$\cot^{-1}\left(\frac{H2}{0.5*P2}\right) < \sin^{-1}\left(\frac{n1}{n2}\right) = \sin^{-1}\left(\frac{1.49}{1.58}\right) = 70.57°$$

Namely, the light reflected by the reflective layer 11d can be directly penetrate through the light-exiting surface 132d, and no reflection can be found at the interface between the light-distributing layer 13d and the light-guiding layer 12d, such that better brightness on the light-exiting surface 132d can be obtained due to substantial reduction in light loss for bouncing light within the light-guiding layer 12d.

As shown in FIG. 15C, when the H2/P2 for the reflective surface 112e is too big, the light 20e reflected by the micro-structures on the reflective surface 112e of the reflective layer 11e would present to be deflected toward the light-introducing surface 15 and also to leave away the front vision angle, such that the detected brightness at the light-exiting surface 132c would be low. Therefore, in order to obtain a better bright performance, the H2/P2 can't be either greater than or equal to 0.5; i.e., satisfying $$\cot^{-1} < \left(\frac{H2}{0.5*P2}\right) > 45°$$

In summary of the aforesaid limitations, in order for the light-guide apparatus in accordance with the present invention to present better brightness performance, the following limitation should be met.

$$45° < \cot^{-1}\left(\frac{H2}{0.5*P2}\right) < \sin^{-1}\left(\frac{n1}{n2}\right)$$

in which the P2 is preferred to be ranged between 80 μm and 250 μm. In the case of P2<80 μm, the yield of the microstructures from the rollers in the co-extrusion process would be reduced. On the other hand, if P2>250 μm, line defects would be highly possible on the light-exiting surface.

While the present invention has been particularly shown and described with reference to a preferred embodiment, it will be understood by those skilled in the art that various changes in form and detail may be without departing from the spirit and scope of the present invention.

We claim:

1. A light-guide apparatus with micro-structures, for accompanying an edge light source, comprising:
a light-guiding layer, further defining a light-introducing surface for allowing entrance of light from the edge light source into the light-guiding layer;
a reflective layer for reflecting the light back to the light-guiding layer; and
a light-distributing layer, to sandwich the light-guiding layer in between with the reflective layer, further defining thereof a free surface opposing to the reflective layer as a light-exiting surface, the light-exiting surface being perpendicular to the light-introducing surface for allowing at least a portion of the light in the light-guiding layer to leave the light-guide apparatus therefrom;
the light-guide apparatus characterized on that:
the reflective layer, the light-guiding layer and the light-distributing layer are manufactured integrally into a unique piece by a co-extrusion process so as to avoid possible existence of an air spacing between the reflective layer and the light-guiding layer, a reflective surface is defined to an interface between the reflective layer and the light-guiding layer, and three-dimensional micro-structures are constructed on the reflective surface;
wherein said micro-structures of said reflective surface satisfy the following criterion:

$$45° < \cot^{-1}\left(\frac{H2}{0.5*P2}\right) < \sin^{-1}\left(\frac{n1}{n2}\right);$$

while n1<n2;
wherein H2 is a depth of said micro-structures of said reflective surface, P2 is a width of said micro-structures of said reflective surface, n1 is a refractive index of said light-distributing layer, and n2 is a refractive index of said light-guiding layer.

2. The light-guide apparatus with micro-structures according to claim 1, further satisfying one of the following criteria:
(1) 0.2335≤(H2/P2)≤0.419;
(2) 80 μm≤P2≤250 μm;
(3) 0.2≤(H2/P2)≤0.319, and 1≤(t1/t2)≤29, wherein t1 and t2 are thicknesses of said light-distributing layer and said light-guiding layer, respectively; and
(4) said micro-structures of said reflective surface being non-continuous micro-structures commonly having an interval G in between thereof ranged from 0 to 1.4 mm.

3. The light-guide apparatus with micro-structures according to claim 1, further including at least one of the following:
a plurality of diffusing particles, mixed in said light-guiding layer;
a plurality of diffusing particles, mixed in said light-distributing layer;
three-dimensional micro-structures constructed on said light-exiting surface;

two plastics with different refractive indexes, mixed in said reflective layer;
a plurality of reflective particles, mixed in said reflective layer; and
one of a coarse surface and a matted surface with a controllable transmittance, formed on said light-exiting surface.

4. The light-guide apparatus with micro-structures according to claim 3,
wherein a difference in refractive index (Δn) between said diffusing particles and said plastics as a base matrix for said light-guiding layer is 0.04<Δn<0.1, a granular size for said diffusing particles is ranged between 2 μm and 10 μm, and a refractive index for said plastics is ranged between 1.42 and 1.63, in the case that said light-guiding layer includes said diffusing particles;
wherein a difference in refractive index (Δn) between said diffusing particles and said plastics as a base matrix for said light layer is 0.04<Δn<0.1, a granular size for said diffusing particles is ranged between 2 μm and 10 μm, and a refractive index for said plastics is ranged between 1.42 and 1.63, in the case that said light-distributing layer includes said diffusing particles;
wherein a mixture ratio for said two plastics is about 7:3, in the case that said reflective layer is mixed with said two plastics with different refractive indexes;
wherein a refractive index for said reflective particles is ranged from 2.2 to 3.2, a weight proportion for said reflective particles is less than 0.5%, a granular size for said reflective particles is ranged from 4-50 μm, a refractive index for said plastics of said reflective layer is ranged from 1.6-2.5, and a difference in refractive index (Δn) between said reflective layer and said light-guiding layer is ranged between 0.05 and 1, in the case that said reflective layer is mixed with said reflective particles; and
wherein a surface roughness (Ra) for said light-exiting surface is 1 μm<Ra<6 μm, in the case that said light-exiting surface includes said coarse surface.

5. The light-guide apparatus with micro-structures according to claim 3, wherein, when said light-exiting surface includes said coarse surface, said coarse surface of said light-exiting surface has a limitation in a surface roughness (Ra) of 1 μm<Ra<2.21 μm.

6. The light-guide apparatus with micro-structures according to claim 1, further including micro-structures located on said light-exiting surface, wherein said micro-structures for said reflective surface and said another micro-structures for said light-exiting surface are arranged in one of a parallel manner and an orthogonal manner.

7. The light-guide apparatus with micro-structures according to claim 6, wherein said micro-structures for said reflective surface and said micro-structures for said light-exiting surface are selected from the group of:
a plurality of triangular strips continuously arranged in a parallel and extending manner;
a plurality of semi-cylindrical strips continuously arranged in a parallel and extending manner;
a plurality of conical protrusions continuously arranged in an array manner;
a plurality of spherical protrusions continuously arranged in an array manner;
a plurality of round-tip protrusions arranged in an array manner;
a plurality of triangular conical strips non-continuously arranged in a parallel and extending manner according to a controllable density-varying pattern of unequal-spacing, sparse outside and dense inside;
a plurality of triangular conical strips non-continuously arranged in a parallel and extending manner according to an equal-spacing pattern;
a plurality of semi-cylindrical strips non-continuously arranged in a parallel and extending manner according to a controllable density-varying pattern of unequal-spacing, sparse outside and dense inside;
a plurality of semi-cylindrical strips non-continuously arranged in a parallel and extending manner according to an equal-spacing pattern;
a plurality of conical protrusions non-continuously arranged in an array manner according to a controllable density-varying pattern of unequal-spacing, sparse outside and dense inside;
a plurality of conical protrusions non-continuously arranged in an array manner according to an equal-spacing pattern;
a plurality of spherical protrusions non-continuously arranged in an array manner according to a controllable density-varying pattern of unequal-spacing, sparse outside and dense inside;
a plurality of spherical protrusions non-continuously arranged in an array manner according to an equal-spacing pattern; and
a plurality of round-tip protrusions non-continuously arranged in an array manner according to a controllable density-varying pattern of unequal-spacing, sparse outside and dense inside;
a plurality of round-tip protrusions non-continuously arranged in an array manner according to an equal-spacing pattern.

8. A backlight module having a light-guide apparatus, comprising:
an edge light source;
a light-guiding layer, further defining a light-introducing surface for allowing entrance of light from the edge light source into the light-guiding layer;
a reflective layer for reflecting the light back to the light-guiding layer;
a light-distributing layer, to sandwich the light-guiding layer in between with the reflective layer, further defining thereof a free surface opposing to the reflective layer as a light-exiting surface, the light-exiting surface being perpendicular to the light-introducing surface for allowing at least a portion of the light in the light-guiding layer to leave the light-guide apparatus therefrom; and
at least an optical film to cover the light-exiting surface;
the backlight module characterized on that:
the reflective layer, the light-guiding layer and the light-distributing layer are manufactured integrally into a unique piece by a co-extrusion process so as to avoid possible existence of an air spacing between the reflective layer and the light-guiding layer, a reflective surface is defined to an interface between the reflective layer and the light-guiding layer, and three-dimensional micro-structures are constructed on the reflective surface, and the micro-structures of the reflective surface satisfy the following criterion:

$$45° < \cot^{-1}\left(\frac{H2}{0.5 * P2}\right) < \sin^{-1}\left(\frac{n1}{n2}\right);$$

while n1<n2;
wherein H2 is a depth of the micro-structures of the reflective surface, P2 is a width of the micro-structures of the reflective surface, n1 is a refractive index of the light-distributing layer, and n2 is a refractive index of the light-guiding layer.

9. An LCD display having a light-guide apparatus, comprising:
an edge light source;
a light-guiding layer, further defining a light-introducing surface for allowing entrance of light from the edge light source into the light-guiding layer;
a reflective layer for reflecting the light back to the light-guiding layer;
a light-distributing layer, to sandwich the light-guiding layer in between with the reflective layer, further defining thereof a free surface opposing to the reflective layer as a light-exiting surface, the light-exiting surface being perpendicular to the light-introducing surface for allowing at least a portion of the light in the light-guiding layer to leave the light-guide apparatus therefrom;
at least an optical film to cover the light-exiting surface; and
an LCD panel, located at a side of the optical film opposing to the light-guiding layer;
the LCD display characterized on that:
the reflective layer, the light-guiding layer and the light-distributing layer are manufactured integrally into a unique piece by a co-extrusion process so as to avoid possible existence of an air spacing between the reflective layer and the light-guiding layer, a reflective surface is defined to an interface between the reflective layer and the light-guiding layer, and three-dimensional micro-structures are constructed on the reflective surface, and the micro-structures of the reflective surface satisfy the following criterion:

$$45° < \cot^{-1}\left(\frac{H2}{0.5*P2}\right) < \sin^{-1}\left(\frac{n1}{n2}\right);$$

while n1<n2;
wherein H2 is a depth of the micro-structures of the reflective surface, P2 is a width of the micro-structures of the reflective surface, n1 is a refractive index of the light-distributing layer, and n2 is a refractive index of the light-guiding layer.

* * * * *